US012748686B1

(12) United States Patent
Madhavan et al.

(10) Patent No.: US 12,748,686 B1
(45) Date of Patent: Sep. 29, 2026

(54) SYSTEMS AND METHODS FOR CONTINUOUS ARCHITECTURE GOVERNANCE USING DYNAMIC ARCHITECTURE MAPPING

(71) Applicant: Fannie Mae, Washington, DC (US)

(72) Inventors: Ajit Madhavan, Washington, DC (US); Yogesh Sawant, Washington, DC (US)

(73) Assignee: Fannie Mae, WA (US)

( * ) Notice: Subject to any disclaimer, the term of this patent is extended or adjusted under 35 U.S.C. 154(b) by 267 days.

(21) Appl. No.: 18/763,742

(22) Filed: Jul. 3, 2024

(51) Int. Cl.

| | |
|---|---|
| ***G06F 11/3668*** | (2025.01) |
| ***G06F 9/445*** | (2018.01) |
| ***G06F 9/455*** | (2018.01) |
| ***G06F 11/34*** | (2006.01) |
| ***G06F 15/78*** | (2006.01) |

(52) U.S. Cl.
CPC ...... *G06F 11/3692* (2013.01); *G06F 9/44505* (2013.01); *G06F 9/455* (2013.01); *G06F 11/3428* (2013.01); *G06F 15/7871* (2013.01)

(58) Field of Classification Search
None
See application file for complete search history.

(56) References Cited

U.S. PATENT DOCUMENTS

| | | | | |
|---|---|---|---|---|
| 12,141,291 | B1 * | 11/2024 | Rappaport | G06F 8/77 |
| 2013/0080122 | A1 * | 3/2013 | Bumbalough | G06F 30/13 703/1 |
| 2015/0067642 | A1 * | 3/2015 | Chen | G06F 8/60 717/121 |
| 2017/0286266 | A1 * | 10/2017 | Rivera | G06F 11/3692 |
| 2018/0024537 | A1 * | 1/2018 | Chauvet | G05B 19/4185 718/104 |
| 2019/0028360 | A1 * | 1/2019 | Douglas | H04L 41/22 |
| 2019/0171438 | A1 * | 6/2019 | Franchitti | G06F 8/65 |
| 2025/0021310 | A1 * | 1/2025 | Sao | G06F 40/40 |
| 2025/0123945 | A1 * | 4/2025 | Griffin | G06F 11/3604 |

* cited by examiner

*Primary Examiner* — Qing Chen
(74) *Attorney, Agent, or Firm* — Foley & Lardner LLP

(57) ABSTRACT

Disclosed are systems and methods for dynamic architecture mapping. In some embodiments, one or more processing circuits identify an architecture parameter of an application based on an architecture framework. The processing circuits generate an application profile of the application based on the architecture parameter and further map, based on the application profile, the architecture parameter to the architecture component by verifying an integration of the architecture component in the application satisfies the architecture parameter. In an example, the processing circuits output a mapped architecture component corresponding to one or more selectable actions provided to a graphical user interface (GUI) for configuring an architecture of the application and generate an architecture index of the application. The processing circuits further provide an application deployment package, provide the package to an architecture deployment system, monitor updated architecture for deviations, and provide an indication of compliance or non-compliance.

20 Claims, 10 Drawing Sheets

SYSTEMS AND METHODS FOR CONTINUOUS ARCHITECTURE GOVERNANCE USING DYNAMIC ARCHITECTURE MAPPING

BACKGROUND

In software application development, entities such as people or companies can implement architecture to verify that applications adhere to predefined criteria and perform reviews to determine compliance. These entities may desire to increase the speed and efficiency of reviews and determine compliance.

SUMMARY

Disclosed is an architecture framework including systems and methods for continuous architecture governance using dynamic architecture mapping. Some embodiments relate to a method for dynamic architecture mapping. In some embodiments, one or more processing circuits identify an architecture parameter of an application based on an architecture framework. The processing circuits generate an application profile of the application based on the architecture parameter and further map, based on the application profile, the architecture parameter to the architecture component by verifying an integration of the architecture component in the application satisfies the architecture parameter. In an example, the processing circuits output a mapped architecture component corresponding to one or more selectable actions provided to a graphical user interface (GUI) for configuring an architecture of the application. The processing circuits further generate an architecture index of the application corresponding to mapped architecture components.

Some implementations relate to a system for dynamic architecture mapping. The system includes data processing system comprising memory and one or more processing circuits configured to identify at least one architecture parameter of an application based on at least one architecture framework. The one or more processing circuits further configured to generate an application profile of the application based on the at least one architecture parameter. The one or more processing circuits further configured to map, based on the application profile, the at least one architecture parameter to at least one architecture component, wherein mapping the at least one architecture parameter comprises verifying an integration of the at least one architecture component in the application satisfies the at least one architecture parameter. The one or more processing circuits further configured to output at least one mapped architecture component corresponding to one or more selectable actions provided to a graphical user interface (GUI) for configuring an architecture of the application. The one or more processing circuits further configured to generate an architecture index of the application corresponding to a plurality of mapped architecture components. In response to receiving a selection of the one or more selectable actions provided to the GUI, the one or more processing circuits are further configured to generate an architecture implementation package. The architecture implementation package includes the at least one mapped architecture component configured to integrate with the architecture of the application. The one or more processing circuits are further configured to provide the architecture implementation package to an application deployment system to integrate the at least one mapped architecture component of the architecture implementation package into the architecture of the application. In response to implementing the at least one mapped architecture component, the one or more processing circuits are further configured to monitor an updated architecture of the application to detect architecture deviations. Monitoring includes comparing the updated architecture of the application to the at least one architecture parameter. The one or more processing circuits are further configured to provide an indication of compliance or non-compliance to the GUI based on the monitoring.

Some implementations relate to one or more non-transitory computer-readable media (CRM) having instructions stored thereon that, when executed by one or more processing circuits, cause the one or more processing circuits to identify at least one architecture parameter of an application based on at least one architecture framework. The one or more non-transitory computer-readable media (CRM) having instructions stored thereon that, when executed by the one or more processing circuits, cause the one or more processing circuits further to generate an application profile of the application based on the at least one architecture parameter. The one or more non-transitory computer-readable media (CRM) having instructions stored thereon that, when executed by the one or more processing circuits, cause the one or more processing circuits further to map, based on the application profile, the at least one architecture parameter to at least one architecture component, wherein mapping the at least one architecture parameter comprises verifying an integration of the at least one architecture component in the application satisfies the at least one architecture parameter. The one or more non-transitory computer-readable media (CRM) having instructions stored thereon that, when executed by the one or more processing circuits, cause the one or more processing circuits further to output at least one mapped architecture component corresponding to one or more selectable actions provided to a graphical user interface (GUI) for configuring an architecture of the application. The one or more non-transitory computer-readable media (CRM) having instructions stored thereon that, when executed by the one or more processing circuits, cause the one or more processing circuits further to generate an architecture index of the application corresponding to a plurality of mapped architecture components.

Figure 1:
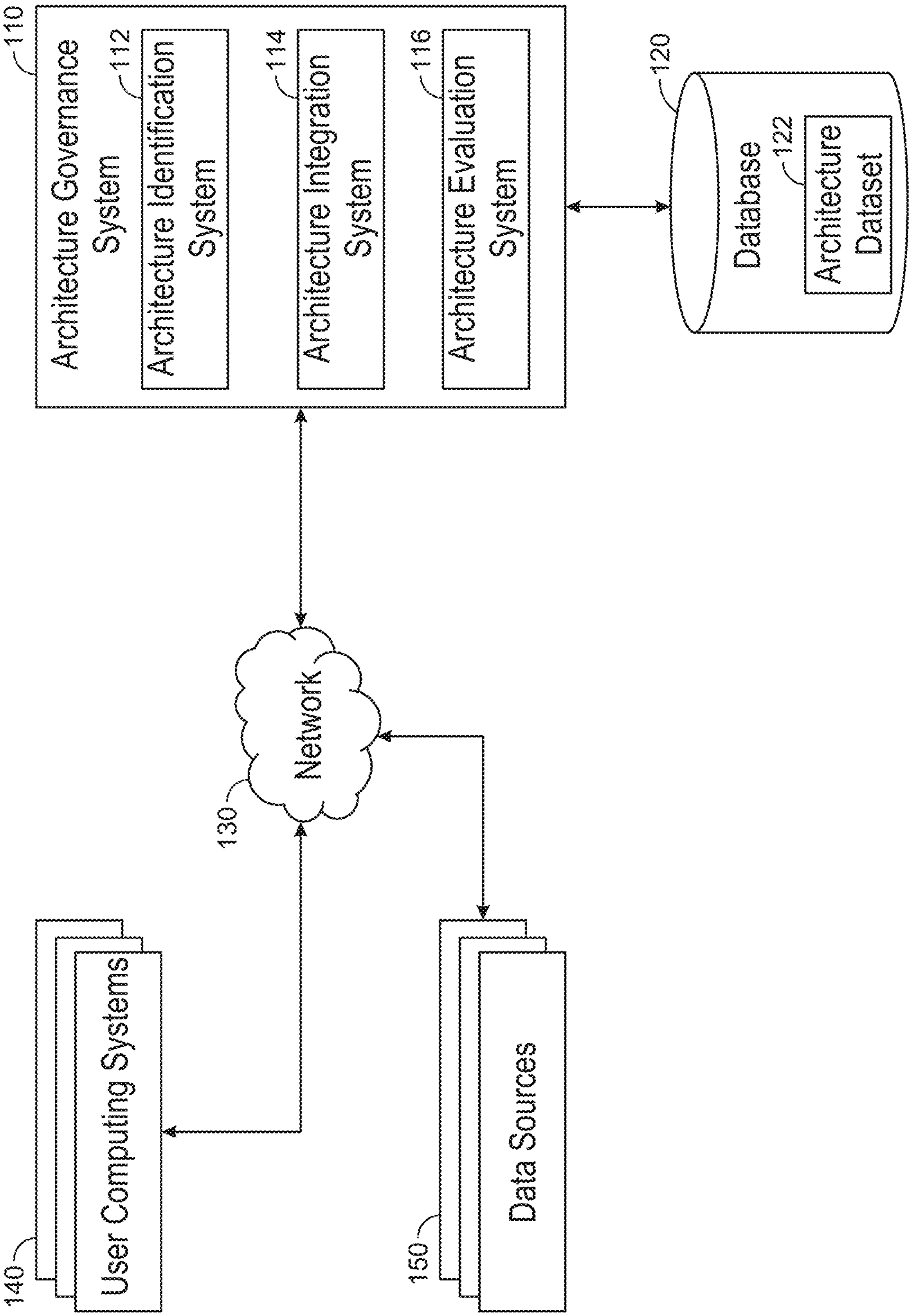
FIG. 1 is a block diagram depicting an implementation of a system for dynamic architecture mapping, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems, apparatuses, and methods described herein relate to dynamic architecture mapping. In software application development, entities such as people or companies may implement architecture to verify that applications adhere to predefined criteria and perform reviews to determine continued compliance. Establishing architecture and performing reviews can be used to verify an application complies with various developer, architecture, or third-party requirements (e.g., encryption requirements, regulatory standards, entity requirements, etc.) and provide interoperability amongst multiple applications by verifying that each application complies with the same set of requirements. However, these requirements are typically expressed using natural language or otherwise require human intervention to determine compliance, and manually reviewing an application for architectural compliance can be difficult, inaccurate, and time-consuming. Further, even after determining a lack of compliance, developers may face difficulties determining how to fix the application and/or whether any pre-existing software components could be implemented that could bring the application into a compliant state.

To address these technical problems, the technical solution implemented herein includes a dynamic architecture mapping system that can automatically analyze an application to determine compliance with architectural parameters and/or requirements. The dynamic architecture mapping system (or architecture governance system) can include an architecture identification system, an architecture integration system, and an architecture evaluation system to detect non-compliant architecture, determine and map preexisting software components to address the non-compliance, and/or integrate (or simulate integrating) the incorporation of software components into the application automatically and efficiently.

Additionally, the systems and methods herein improve computing performance by verifying architectural compliance through dynamically mapping architecture parameters to components based on a codified architecture framework. This codification transforms subjective architectural criteria into quantifiable parameters that can be processed and systematically modeled. As a result, the technical solution reduces the need for manual oversight in compliance checks, minimizes human error, and accelerates the validation process. For example, instead of relying on developers or other individuals to identify an applicant's compliance with natural-language architecture parameters, the systems and methods disclosed herein can perform this review by determining a selection of software components to integrate into an application to address any architectural deficiencies and simulating the incorporation of the software components into the application to determine whether the updated application complies with the architecture parameter(s). This technical solution improves compliance assessments, reduces errors, and enhances computational efficiency by executing validation steps to optimize software routines.

The graphical user interface provided by the systems and methods can facilitate the mapping and configuration of architecture parameters to components, increasing the speed and efficiency of continuous architecture governance. By integrating a visual tool, the systems and methods disclosed herein provides users that capability to configure and adapt the software architecture quickly and directly. This interface can be used to update the architecture index to be displayed and/or viewed in real-time (or near real-time), which can minimize storage requirements and computational overhead associated with manual updates. The automated updating can be reflected as architectural changes, improving the responsiveness and decreasing operational latency during development cycles. Accordingly, the systems and methods can provide developers with dynamic information to efficiently determine whether an application (or an update to an application, such as a patch) complies with stated architectural requirements (e.g., architecture parameters of a relevant organization or entity).

Furthermore, by determining and mapping architecture components to parameters, the systems and methods can customize architecture requirements and improve the scalability of software applications. The architecture index generated by the system can be used to provide an up-to-date representation of architecture components implemented by a software application, enabling new components or software packages to be integrated within new applications and thereby improving integration of new components and modifications to existing ones. This adaptability reduces both the time and resources used for system upgrades since updates to architecture standards can be integrated using the technical solutions of the various implementations described herein.

As used herein, "architecture" refers to the structured arrangement and interaction of components within a software system or application. That is, architecture can include the configuration of software packages or modules, the definition of interfaces, and the underlying principles guiding design and evolution. For example, an architecture might include a database, application server, and client-side user interface, each interacting through defined protocols.

As used herein, an "architecture framework" refers to a collection of entity or organizational guidelines for an application (e.g., collection of requirements for system enhancements and maintenance, listing of entity-wide encryption standards, etc.). For example, an architecture framework could specify protocols for updating software components or for integrating new features while maintaining system integrity. In another example, an architecture framework could include multiple architecture parameters defining requirements for architecture of an application.

As used herein, an "architecture parameter" refers to a characteristic or criterion for a system architecture. That is, the architecture parameter could include scalability, reliability, response time, security requirements, etc. For example, an architecture parameter could be a security protocol that should be implemented to provide data encryption across a network.

As used herein, an "architecture component" refers to a modular unit of software or hardware configured to perform a distinct function within a broader system architecture, often reusable across multiple applications to meet various architecture parameters. For example, a common encryption library that can be deployed across different software products to provide data security. Further, as used herein, a "mapped" architecture component refers to the association of a specific architecture component with one or more architecture parameters, indicating that the component meets or contributes to the specified requirements. For example, linking a specific database management system to a performance-related architecture parameter to verify its capability to handle large datasets efficiently.

As used herein, an "architecture profile" refers to a description or specification that outlines how an application or system can satisfy or meet various architectural parameters and requirements. The architecture profile can facilitate the assessment of the system's compliance with desired standards and its suitability for specific tasks or environments. For example, the architecture profile might detail how a software application aligns with security, efficiency, and/or scalability standards and provide a basis for comparison with other applications or systems.

As used herein, "architecture as a code" or "ACC" and the like refer to implementations of architecture parameters as executable functions or software algorithms (e.g., as computer code in languages such as C++, Python, etc.).

Referring generally to the FIGS., disclosed are systems and methods for dynamic architecture mapping. In some embodiments, one or more processing circuits can identify an architecture parameter of an application based on an architecture framework. The processing circuits can generate an application profile of the application based on the architecture parameter and can map, based on the application profile, the architecture parameter to the architecture component by verifying an integration of the architecture component in the application satisfies the architecture parameter. In an example, the processing circuits can output a mapped architecture component corresponding to one or more selectable actions provided to a graphical user interface (GUI) for configuring an architecture of the application. The processing circuits can further generate an architecture index of the application corresponding to mapped architecture components.

Referring now to FIG. 1, a block diagram depicting an example of an architecture governance system 110 in a computing environment 100 is shown, according to some embodiments. As shown, the computing environment 100 includes a database 120, a network 130, one or more user computing systems 140, and one or more data sources 150. The architecture governance system 110 can be communicatively coupled, via the network 130, to the database 120, the user computing system 140, and the data sources 150. The database 120, the user computing system 140, and/or the data sources 150 can initiate and/or route (e.g., provide) architecture data and other types of data, such as additional data that can be used in evaluating a software applicant's compliance with architecture parameters (e.g., modularity or scalability requirements, performance metrics, reliability metrics, security standards, data integrity standards, interoperability requirements, maintainability requirements, usability standards, technology stack specifics, code quality metrics, resources utilization test results, development practices, environmental constraints, industry-wide compliance standards, cost constraints, lifecycle stage requirements, requirements dictated by service level agreements (SLAs), architectural style requirements, data flow regulations, etc.) by the architectural governance system 110.

In some embodiments, the database 120 and the data sources 150 can provide data via various separate communication pipelines (e.g., network channels, data communication channels, and/or data feeds), which can be used in mapping by the architecture governance system 110. For example, the architecture governance system 110 can provide an application programming interface (API) or multi-APIs to access various data generated or routed by the database 120, the user computing system 140, and/or the data sources 150. In some embodiments, the architecture governance system 110 can provide data to the database 120 and/or data sources 150 via various separate communication pipelines (e.g., network channels, data communication channels, and/or data feeds).

Still referring to FIG. 1, the architecture governance system 110 is shown to include an architecture identification system 112, an architecture integration system 114, and an architecture evaluation system 116. The architecture governance system 110 is shown to be communicatively coupled to the database 120, which includes an architecture dataset 122. These computing systems can include at least one processor (e.g., a physical processor and/or a virtualized processor) and at least one memory (e.g., a memory device and/or virtualized memory). The database 120, network 130, user computing systems 140, and/or data sources 150 can also include at least one processor (e.g., a physical processor and/or a virtualized processor) and at least one memory (e.g., a memory device and/or virtualized memory).

In some embodiments, the database 120 and/or the data sources 150 (hereafter referred to as "data sources 150") can provide data to the architecture governance system 110. In some embodiments, the database 120 and/or the data sources 150 can be structured to collect data from other devices on network 130 (e.g., user computing systems 140) and relay the collected data to the architecture governance system 110. In some embodiments, the database 120 and/or the data sources 150 can host or otherwise support a search or discovery engine for Internet-connected devices. The search or discovery engine can provide data, via the network 110, to the analysis system 150. In some embodiments, the database 120 and/or the data sources 150 can provide data to the architecture governance system 110 (e.g., various data sources and/or data feeds) including data associated with architecture of an entity or application (e.g., regarding architecture parameters, architecture components, testing data form testing an application, etc.) or other data.

In some embodiments, the one or more user computing systems 140 can be used to perform various actions and/or access various types of data, some of which can be provided over network 130. The user computing system 140 can be used to electronically transmit data (e.g., event data) to the hydration system 110. In some embodiments, the user computing system 140 can be used to transmit data to the database 120 and/or the data sources 150. The user computer system 140 can also be used to access websites (e.g., using an Internet browser), and entity graphical interfaces (e.g., architecture dashboard or interface), and/or to receive any other type of data. For example, a user can be a business entity or software developer wanting to update an application to adhere to various architecture parameters (e.g., data integrity requirements, regulatory requirements, organizational operation requirements, etc.) associated with an architecture framework (e.g., of an organization) via the user computing system 140 (e.g., via a GUI displayed via a screen of the user computing system 140).

The architecture governance system 110 can be configured to facilitate communication (e.g., via network 130) between the database 120, network 130, user computing systems 140, data sources 150, and/or additional systems described herein (e.g., architecture identification system 112, architecture integration system 114, architecture evaluation system 116, etc.). The facilitation of communication can be implemented as an application programming interface (API) (e.g., REST API, Web API, and/or customized API, etc.), batch files, and/or queries. In various arrangements, the architecture governance system 110 can also be configured to control access to resources of the architecture governance system 110 and database 120. The API can be used by the architecture governance system 110 and/or computing systems to exchange data and make function calls in a structured format. The API can be configured to specify an appropriate communication protocol using a suitable electronic data interchange (EDI) standard or technology. In some arrangements, data is exchanged by components of the architecture governance system 110 using web services. Where data is exchanged using an API configured to exchange web service messages, some or all components of the computing environment can include or can be associated with (e.g., as a client computing device) one or more web service node(s).

The architecture governance system 110 can communicate over the network 130 via a variety of communication standards (e.g., client/server, peer-to-peer architectures, etc.). The architecture governance system 110 and/or database 120 can generate and provide datasets (e.g., an initialization dataset, an architecture dataset 122, etc.). The architecture governance system 110 can be communicatively and operatively coupled to the database 120, which can store a variety of information relevant to architecture parameters and architecture components. In some embodiments, the architecture governance system 110 can receive information from the user computing systems 140 and/or data sources 150. The architecture governance system 110 can request and/or provide input to the architecture dataset 122 of the database 120 (e.g., for information and/or to store information in the database 120). In some embodiments, the database 120 includes various transitory and/or non-transitory storage media. The storage media can include optical storage, flash storage, RAM, or any types of devices and technologies used to store digital data. The database 120 and/or the architecture governance system 110 can use various APIs to perform database functions (i.e., managing data stored in the database 120, simulating the incorporation of architecture components in the application using a virtual testing environment, etc.). The APIs can include, for example, SQL, NoSQL, NewSQL, ODBC, and/or JDBC.

As described above, the architecture governance system 110 can include the architecture identification system 112, the architecture integration system 114, and the architecture evaluation system 116. In some embodiments, the architecture identification system 112 can be included in the architecture governance system 110 to provide real-time identification of architecture parameters, architecture components, and/or architecture compliance of an application (e.g., by a changed data capture or "CDC" function, etc.). In some embodiments, the architecture identification system 112 is configured to monitor updates (e.g., changes, alterations) of architecture data or other data in the data source (e.g., database 120 and/or data sources 150) via one or more data pathways.

In some embodiments, the architecture identification system 112 can identify an architecture parameter of an application based on an architecture framework. For example, the architecture identification system 112 can determine or identify one or more requirements (e.g., reliability metrics, security standards, data integrity standards, interoperability requirements, maintainability requirements, usability standards, etc.) by analyzing or evaluating current architecture standards, historical compliance data, industry standards, entity preferences, and so on. In some embodiments, the architecture parameter can be, but is not limited to, an entity requirement, a security requirement, or a security tolerance requirement. For example, an entity requirement may be an entity specific architecture requirement such as organizational data handling policies. In another example, a security requirement may be a specific architecture security requirement such as mandatory two-factor authentication. In yet another example, a security tolerance requirement may be a specific architecture security tolerance requirement such as allowable downtime per month. In some embodiments, the architecture can satisfy a plurality of architecture parameters based on implementing the at least one architecture component in the application. That is, implementing the architecture parameters in an application could include configuring middleware to ensure data security. For example, implementing the architecture parameters could include deploying encryption protocols across communication channels.

The architecture governance system 110 can also include the architecture integration system 114. In some embodiments, the architecture integration system 114 can incorporate or simulate the incorporation of an architecture component (e.g., software feature) in an application using data from various sources (e.g., database 120, data sources 150, etc.) within the computing environment 100. For example, the architecture integration system 114 can update an application by integrating a new architecture component into the application, or by modeling the application (e.g., virtually) and simulating the incorporation of the new architecture component by executing the application in a testing environment.

In some embodiments, the architecture integration system 114 can generate an application profile of the application based on the at least one architecture parameter. That is, an application profile of the particular application can be a detailed configuration outline including its components, dependencies, and interactions. For example, an application profile could be a structured overview of the software's modules, interfaces, and data flows. In some embodiments, the generation of the application profile could include extracting and documenting system specifications and performance metrics. For example, the generation could include cataloging API endpoints and associated services. In another example, detailing resource utilization under various load conditions. Accordingly, the application profile can be used to map the at least one architecture parameter to at least one architecture component because it identifies elements and their interactions, guiding targeted enhancements or integrations.

In some embodiments, the architecture integration system 114 can map, based on the application profile, the at least one architecture parameter to at least one architecture component. Generally, mapping relates to aligning system functionalities with specified compliance standards. That is, mapping the at least one architecture parameter can include verifying an integration of the at least one architecture component in the application satisfies the at least one architecture parameter. In some embodiments, the at least one architecture component in the application could be a secure storage solution. Additionally, to satisfy the at least one architecture parameter can include adhering to industry-specific data protection regulations. For example, verifying an integration could be through automated testing. In another example, verifying an integration could be through user acceptance testing.

In some embodiments, identifying the at least one architecture component based on the application profile by the architecture integration system 114 can include determining the application profile corresponding to the application failing to satisfy at least one architectural parameter. That is, the application profile corresponding to the application failing to satisfy at least one architectural parameter can be defined by performance deficits under peak loads. For example, a determination could be that the current database configuration does not support expected transaction volumes. Furthermore, the analysis might suggest optimizations or alternative technologies. In some embodiments, identifying the at least one architecture component based on the application profile by the architecture integration system 114 can include identifying a plurality of candidate architectural components including the at least one architecture component. That is, candidate architectural components could be a variety of database management systems. For example, candidate architectural components could be SQL and NoSQL options. Furthermore, identifying the candidate architectural components could include evaluating their scalability and security features. For example, identifying the candidate architectural components could include identifying the candidate architectural components could include assessing encryption capabilities and data recovery processes. In some embodiments, identifying the at least one architecture component based on the application profile by the architecture integration system 114 can include outputting the at least one architecture component based on (1) comparing the plurality of candidate architectural components to the architecture of the application and (2) determining a compatibility between the at least one architecture component and the architecture of the application. In some embodiments, comparing the candidate architectural components could include a detailed feature comparison. For example, comparing could include checking compatibility with existing infrastructure. In some embodiments, determining the compatibility could include simulating integration scenarios. For example, determining the compatibility could include conducting load testing with new components.

In some embodiments, mapping by the architecture integration system 114 can include extracting a first data package from an architecture component. For example, the first data package can include integration data corresponding with integrating the at least one architecture component in the application. In this example, the first data package could be API specifications and configuration settings. Additionally, integrating can include updating an application deployment package of the application to include the at least one architecture component. That is, updating the application deployment package could include modifying the deployment scripts to incorporate new modules. For example, updating the application deployment package could include adding library dependencies.

In some embodiments, mapping by the architecture integration system 114 can also include extracting a second data package from the at least one architecture parameter. For example, the second data package can include one or more criteria for verifying the integration of the at least one architecture component in the application satisfies the at least one architecture parameter. In this example, the second data package could be compliance checklists and regulatory frameworks. That is, one or more criteria could be specific security benchmarks and performance thresholds. In some embodiments, the criteria can be used to verify an integration by conducting automated compliance audits. Furthermore, satisfying an architecture parameter can include achieving predetermined uptime and efficiency targets. For example, satisfying the architecture parameter could include maintaining system availability above 99.9%.

In some embodiments, mapping by the architecture integration system 114 can also include generating a plurality of application states. For example, a first application state of the plurality of application states could be based on the application prior to integration. In this example, the first application state could be the baseline performance metrics. In another example, a second application state of the plurality of application states could be based on integrating the at least one architecture parameter in the application. In this example, the second application state could be post-integration performance metrics. In some embodiments, integrating can include applying the integration data simulating the incorporation of the at least one architecture component in the architecture of the application by executing the application deployment package. That is, applying the integration data simulating the incorporation could include running a series of stress tests. For example, simulating the incorporation of an architecture component could be through virtual environment trials. Furthermore, executing an application deployment package could include deploying updates in a staged environment. For example, executing an application deployment package could include conducting phased rollouts.

In some embodiments, mapping by the architecture integration system 114 can also include linking component data including the at least one architecture component with parameter data including the at least one architecture parameter. That is, the linking can occur in response to the integration of the at least one architecture component in the application satisfying the at least one architecture parameter. For example, the component data could be implementation logs. In this example, the component data could be linked by cross-referencing performance outcomes with expected benchmarks. Furthermore, the parameter data could be updated compliance regulations and internal standards.

The architecture governance system 110 can also include the architecture evaluation system 116. In some embodiments, the architecture evaluation system 116 can output at least one mapped architecture component corresponding to one or more selectable actions provided to a graphical user interface (GUI) for configuring an architecture of the application. The mapped architecture component can include at least one architecture component and the application architecture can include the plurality of mapped architecture components. That is, the plurality of mapped architecture components may be displayed as interactive elements on the GUI. Additionally, the output can be visualized in a user-friendly format. For example, the GUI could be provided (or presented) on the user computing system 140 and can offer drag-and-drop capabilities. Additionally, the selectable actions for configuring the architecture of the application can be selected to customize system settings. For example, a selectable action could be adjusting security levels.

In some embodiments, the architecture evaluation system 116 can determine that the architecture compliance index complies with the at least one predefined benchmark. Complying with the benchmark can include modeling, using an integration model, an integration efficiency or performance alignment of the application incorporating the at least one architecture component using the at least one predefined benchmark. That is, the integration model can be trained on predefined benchmarks to output data corresponding with the integration efficiency or performance alignment. For example, the integration model could be, but is not limited to, an artificial intelligence model, predictive algorithms, machine learning techniques, and neural networks. In some embodiments, the integration efficiency or performance alignment of the application incorporating the at least one architecture component could be quantified through simulation results. For example, integration efficiency may be measured by reduced processing times. In another example, integration efficiency may be evaluated through resource utilization rates. In yet another example, performance alignment may be assessed by alignment with scalability targets. In yet another example, performance alignment may be verified by compliance with security protocols. Accordingly, the integration model can be trained to adapt to varying operational scenarios.

In some embodiments, the architecture evaluation system 116 can generate an architecture index of the application corresponding to a plurality of mapped architecture components. That is, the architecture index can be a quantitative value of compliance with established standards. In some embodiments, the generation of the architecture index can include aggregating individual compliance scores. For example, the architecture index could be a compliance score derived from various performance metrics. Alternatively or in combination, the generation of the architecture index could include benchmarking against industry standards. In another example, the architecture index could be a compliance score adjusted for system complexity. Furthermore, mapping by the architecture evaluation system 116 can include comparing at least one of the first application state or the second application state to the one or more criteria to generate an architecture compliance index. That is, comparing could include cross-referencing actual performance data with expected outcomes. The comparison can be used to generate the architecture compliance index by calculating deviations from the norm and adjusting scores accordingly.

In some embodiments, in response to the architecture integration system 114 integrating or simulating the integration of an architecture component into an application, the architecture evaluation system 116 can access data, such as the application and/or outputs from testing the application, and determine whether the integration or simulated integration of the new architecture component satisfies one or more architecture parameters (e.g., development requirements). For example, an integration could be verified through regression testing. That is, determining the integration of the at least one architecture component of the plurality of mapped architecture components in the application satisfies the at least one architecture parameter can include determining that incorporating or embedding the at least one architecture component in the application causes the application to meet or exceed at least one predefined benchmark for functionality, performance, or compatibility. For example, incorporating could include embedding security features into the application architecture. In another example, embedding could include integrating real-time data analytics. Additionally, a predefined benchmark for functionality could be zero data breaches. Furthermore, a predefined benchmark for performance could be sub-second response times. Moreover, a predefined benchmark for compatibility could be full interoperability with existing systems. In some embodiments, the at least one predefined benchmark correspond to the at least one architecture parameter. For example, a predefined benchmark could corresponding to an architecture parameter could be compliance with GDPR.

In some implementations, simulating can include implementing the updated application deployment package in a controlled virtual environment. For example, a simulated integration could be conducted through a sandbox testing protocol. Furthermore, the controlled virtual environment can be implemented to emulate or simulate hardware configurations, network conditions, and system interactions of the application. For example, the controlled virtual environment can be implemented to emulate hardware configurations, network conditions, and system interactions of the application by replicating a production environment. In another example, the controlled virtual environment can be implemented to simulate hardware configurations, network conditions, and system interactions of the application by creating a virtual network overlay.

In some embodiments, the architecture evaluation system 116 can identify the at least one architecture component based on comparing the at least one architecture component to the plurality of mapped architecture components. That is, the at least one architecture component can include an implementation of the at least one architecture parameter. For example, comparing can include feature matching and compatibility checks. In some embodiments, the architecture evaluation system 116 can also monitor the application for an update to the architecture. That is, monitoring the application could include tracking changes to the codebase and configuration files. Furthermore, an update could include a modification to the at least one architecture parameter, to at least one of the plurality of mapped architecture components, or the architecture of the application. For example, a modification to the at least one architecture parameter could be an update to data encryption standards. In another example, a modification to at least one of the plurality of mapped architecture components could be an upgrade to a more efficient database system. In another example, a modification to the architecture of the application could be the introduction of a new user authentication method. Furthermore, in response to identifying the update to the architecture, the architecture evaluation system 116 could determine the modification to the at least one architecture parameter, to at least one of the plurality of mapped architecture components, or architecture of the application causes the application to fail to satisfy the at least one architecture parameter. For example, failing to satisfy the at least one architecture parameter could include a decrease in system response time due to the new authentication method. In another example, failing to satisfy the at least one architecture parameter could include non-compliance with updated privacy regulations. In some implementations, the mapping and the outputting can be re-performed by the architecture integration system 114 and architecture evaluation system 116 in response to the integration of the at least one architecture component in the application satisfying the at least one architecture parameter.

In some embodiments, the architecture integration system 114 can generate an architecture implementation package. That is, the architecture implementation package may be generated in response to receiving a selection of the one or more selectable actions provided to the GUI. For example, the architecture implementation package may include various resources such as configuration scripts, resource allocation templates, and integration guidelines (e.g., setup instructions, deployment configurations, compliance checklists). In another example, the architecture integration system 114 may use an interactive configuration interface (e.g., graphical tools, wizards, templates) to create the package by selecting compatible architecture components from available options. In some implementations, the architecture implementation package includes the at least one mapped architecture component configured to integrate with the architecture of the application. For example, the mapped architecture component may include middleware services, data processing modules, or user authentication systems (e.g., message brokers, ETL processes, OAuth services) to integrate with an application development environment of the application.

Continuing with the architecture implementation package, the architecture integration system 114 can also automate the generation of the implementation package by using predefined templates and configuration files. In some embodiments, the generation process can include selecting relevant components based on the application profile and architecture parameters. For example, the architecture integration system 114 can utilize a library of templates customized to different architectural styles and requirements, such as microservices architecture, layered architecture, patents, or event-driven architecture. Each template can contain standardized configuration scripts, dependency management files, and integration guidelines specific to the architecture component being deployed. The architecture integration system 114 can dynamically adjust these templates to match the specific requirements and architecture of the application by incorporating application-specific data, such as resource allocation limits, security policies, and performance criteria. This can include automating the customization of configuration scripts to set environment-specific variables, paths, and resource identifiers. For example, a configuration script might be adjusted to specify database connection strings, API endpoints, and authentication credentials unique to the deployment environment In some embodiments, the architecture implementation package can include deployment configurations that facilitate automated provisioning and scaling of resources. This can be achieved by implementing and/or employing infrastructure-as-code (IaC) tools. The implementation package can include scripts for automated deployment pipelines that set up the necessary infrastructure, deploy the application components, and configure the environment based on the architecture parameters. For example, the package can contain IaC manifests that define the desired state of the application, including service definitions, deployment strategies, and resource quotas, ensuring that the deployment adheres to the defined architecture framework. Furthermore, the architecture integration system 114 can generate integration guidelines as part of the implementation package. These guidelines can provide step-by-step instructions for deploying and configuring the architecture components, ensuring that the integration process is consistent and repeatable. This can include detailed documentation on setting up dependencies, configuring middleware services, and verifying compliance with architecture parameters. For example, integration guidelines might include instructions for setting up secure communication channels, configuring load balancers, and implementing monitoring and logging solutions to ensure that the deployed application meets performance and reliability standards. In some embodiments, the architecture implementation package can also include compliance checklists and validation scripts to verify that the integrated components meet the required architecture parameters. These checklists can be used during the deployment process to ensure that all necessary configurations are applied and that the application is compliant with industry standards and organizational policies. Validation scripts can automate the testing of critical functionality, such as security checks, performance benchmarks, and interoperability tests, providing assurance that the integration meets the desired criteria.

In some embodiments, the architecture integration system 114 can provide the architecture implementation package to an application deployment system (e.g., architecture governance system 110, etc.) to integrate the at least one mapped architecture component of the architecture implementation package into the architecture of the application. For example, integration may include the architecture integration system 114 deploying the mapped architecture components using automated deployment techniques and/or processes (e.g., deployment scripts, configuration management tools, integration protocols) for providing a mapped architecture component configured to integrate with architecture of the application. In another example, the architecture implementation package can include containerized microservices that can be deployed within an application (e.g., into an existing container orchestration system of an application, etc.) to facilitate the integration or implementation of the mapped architecture component into the architecture of the application (e.g., adding new software modules, replacing modules, adjusting parameters etc.).

The deployment process can use Continuous Integration and Continuous Deployment (CI/CD) pipelines to ensure a streamlined and automated approach. The architecture integration system 114 can implement and/or employ the CI/CD tools to automate the build, test, and deployment stages. For example, upon receiving the architecture implementation package, the CI/CD pipeline can trigger a series of automated tasks, including code compilation, unit testing, and packaging the application with the new architecture components. This can ensure that the deployment process is repeatable, consistent, and minimizes the risk of human error. To facilitate integration, the architecture implementation package can include infrastructure definitions compatible with infrastructure-as-code (IaC) tools. These definitions, written in languages such as HCL for Terraform or YAML for Ansible, can specify the required infrastructure resources, such as virtual machines, network configurations, and storage allocations. During the deployment process, the application deployment system can use these IaC scripts to provision and configure the necessary infrastructure, ensuring that the environment is correctly set up to support the new architecture components.

Containerization implementations can be employed to encapsulate the new architecture components into container images. These images can be defined in container files, which specify the environment settings, dependencies, and executable commands required to run the components. The architecture implementation package can include these container files and pre-built container images stored in a container registry. The application deployment system can then pull these images and deploy them into a container orchestration platform. The container orchestration platform manifests can included in the package can define the deployment configurations, such as pod specifications, service definitions, and horizontal scaling policies, facilitating the automated deployment of the containerized components. Configuration management tools can be implemented and/or employed to apply the necessary configurations to the application and its environment. The architecture implementation package can include configuration scripts or playbooks that define the desired state of the application, specifying settings such as file paths, environment variables, and system properties. The application deployment system can execute these scripts to configure the application and ensure that the new architecture components are correctly integrated and operational.

Integration protocols such as REST APIs can be utilized to facilitate communication between the new architecture components and the existing application modules. The architecture implementation package can include API specifications, endpoint definitions, and communication protocols that outline how the new components interact with the existing system. During deployment, the application deployment system can configure these communication channels, ensuring that data flows seamlessly between the components and that the application operates as intended. In some implementations, the architecture integration system 114 can also include validation and monitoring tools as part of the architecture implementation package. These tools can be implemented and/or employed to automate the process of verifying that the new components meet the specified architecture parameters and perform as expected. For example, automated test scripts can be executed post-deployment to verify functionality, performance, and compliance with security standards. Monitoring systems can be configured to track system performance, log application behavior, and alert administrators to any issues, ensuring that the integrated architecture components operate reliably in the production environment.

In some implementations, in response to implementing the at least one mapped architecture component, the architecture evaluation system 116 can monitor an updated architecture of the application to detect architecture deviations. For example, the updated architecture may include an original architecture with the newly added or implemented components (e.g., mapped components identified for satisfy or complying with architecture parameters or other software development requirements). In an example, monitoring may include the architecture evaluation system 116 identifying deviations, changes, or other departures from a predefined architecture framework (e.g., collection of architecture parameters or requirements. Further, monitoring may include performing drift detection to identify discrepancies between an intended architecture state and an actual (e.g., deployed state), which can include the architecture evaluation system 116 executing various processors or techniques (e.g., configuration checks and performance monitoring (e.g., system audits, real-time analysis, anomaly detection, etc.)) to determine changes or differences between the intended and actual states. In some implementations, monitoring includes comparing the updated architecture of the application to the at least one architecture parameter. For example, monitoring may include examining system logs for unauthorized changes, analyzing network traffic for performance bottlenecks, and/or evaluating resource usage for inconsistencies (e.g., CPU, memory, and storage utilization metrics) to facilitation satisfaction of or adherence to architecture guidelines (e.g., at least one architecture parameter). In another example, comparing may include validating an alignment between the mapped architecture component and an intended (e.g., simulated and verified) state of the application by analyzing or cross-referencing current API endpoints, data schemas, and/or service workflows to determine the incorporation or implementation of the mapped architecture component into the architecture of the application either complies with or does not comply with various architecture parameters.

In some implementations, monitoring the updated architecture can include continuous and automated processes to verify compliance with the predefined architecture parameters. The architecture evaluation system 116 can implement and/or employ configuration management tools or monitors to perform regular configuration checks. These tools can compare the current state of the application against the desired state as defined in the architecture implementation package. Any deviations can be flagged for review, allowing for remediation to maintain alignment with the architecture framework. In addition to configuration checks, the architecture evaluation system 116 can use execute performance monitoring to assess system behavior in real time. For example, performance monitoring can include collecting and visualizing metrics related to CPU usage, memory consumption, network throughput, and disk I/O. By setting up thresholds and alerts, the system can detect anomalies indicating potential architecture deviations. For example, unexpected spikes in resource usage might suggest an issue with the newly integrated components, prompting further investigation and corrective actions. Drift detection can be used in monitoring, to facilitate the identification of divergence (e.g., from the intended architecture state) in the deployed state of the application. This process can include performing version control and implementing and/or employing infrastructure-as-code (IaC) tools to track changes over time. The architecture evaluation system 116 can compare the current deployment configurations against the baseline definitions stored in version control repositories. Any unauthorized changes or drifts can be identified, ensuring that the system remains consistent with the intended architecture.

In some implementations, audits can be scheduled to review system configurations, security settings, and compliance with architecture parameters. Auditing can include generating reports on the state of the application, identifying any deviations from the architecture guidelines. The reports can be used to inform stakeholders and guide remediation efforts to bring the system back into compliance. In some implementations, real-time analysis and anomaly detection can be implemented and/or employed using machine learning algorithms to analyze patterns in system behavior, identifying deviations that may not be immediately apparent through traditional monitoring techniques. For example, a change in API response times or a drop in transaction throughput can be indicative of underlying issues with the architecture components. By continuously analyzing data streams, the architecture evaluation system 116 can proactively identify and address potential problems before they impact the overall system performance. In some implementations, comparing the updated architecture to the architecture parameters can include validating that the new components are functioning as intended and are properly integrated into the system. This can include examining system logs for unauthorized changes, analyzing network traffic for performance bottlenecks, and evaluating resource usage for inconsistencies. For example, logs can be scanned for changes in configuration files or unauthorized access attempts, while network traffic analysis can reveal latency issues or unexpected data flows. Resource usage metrics can be compared against expected baselines to ensure that the system is operating efficiently. In some implementations, validating the alignment between the mapped architecture component and the intended state can include cross-referencing current API endpoints, data schemas, and service workflows. For example, automated testing frameworks can be implemented to simulate transactions and validate responses against expected outcomes. By ensuring that the integrated components are correctly handling data and maintaining service workflows, the architecture evaluation system 116 can verify compliance with the architecture parameters.

In some implementations, the architecture identification system 112 can provide an indication of compliance or non-compliance to the GUI based on the monitoring. That is, an indication may be an icon or status message displayed on a user interface or GUI, such as a green checkmark for compliance or a red exclamation mark for non-compliance. In another example, a non-compliance indication could be a red warning icon accompanied by a detailed message (e.g., "Unauthorized architecture modification detected,"

"Resource allocation exceeds architectural limits," etc.). Further, a compliance indication could be an alert banner on the dashboard (e.g., "Component Integrated Successful," "No Drift Detected," "Compliant Architecture," etc.). In an example, providing includes the architecture identification system 112 may include outputting or updating content, icons, graphics, user-interactive features, and/or various other graphical user interface items to indicate the integration of the mapped component causes the application to be in a compliant (e.g., satisfactory) state or a non-compliant state (e.g., unsatisfactory state).

The process of providing compliance indications can include real-time updates to the GUI, ensuring that users are informed of the application's architecture status. The architecture identification system 112 can integrate with visualization libraries and frameworks to dynamically render compliance indicators. For example, upon detecting compliance, the system can update the GUI with a green checkmark next to the relevant architecture components, signaling successful integration and adherence to architecture parameters. In cases of non-compliance, the system can provide messages with the visual indicators. The messages can be generated using natural language processing (NLP) to convert technical monitoring data into user-friendly explanations. For example, if an unauthorized architecture modification is detected, the system can display a red exclamation mark and a message explaining the nature of the modification and its impact on compliance. This message can include details such as which components were altered, the nature of the changes, and recommendations for remediation. Additionally, the architecture identification system 112 can use interactive elements to facilitate user engagement and corrective actions. For example, clicking on a non-compliance warning icon can expand a detailed view that includes logs, performance metrics, and suggested steps to address the issue. To verify that compliance status is accurately and consistently reflected, the architecture identification system 112 can employ a continuous feedback loop with the monitoring components. This loop can include regular updates from the architecture evaluation system 116, which continuously monitors the application's architecture for deviations. Any changes in compliance status are immediately communicated to the architecture identification system 112, which then updates the GUI accordingly.

In some implementations, the architecture evaluation system 116 can also provide historical data views, allowing users to track compliance trends over time. For example, the provide historical data views can be implemented using time-series databases and visualization tools, providing charts and graphs that display compliance status changes, the frequency of non-compliance events, and the duration of each compliance state. In some implementations, the architecture identification system 112 can also integrate with notification systems to provide proactive alerts. For example, in addition to displaying compliance status on the GUI, the system can send email or SMS notifications to relevant stakeholders when a non-compliance event occurs. These notifications can include summary information and links to the detailed views on the GUI.

As shown, the dynamic architecture mapping of FIG. 1 provide technical improvements over traditional static mapping approaches. That is, the architecture governance system 110 provides improvements to flexibility, scalability, and compliance adaptability. Accordingly, the technical problem of static and inflexible architecture frameworks is solved by the technical solution of dynamic, adaptable, and scalable architecture mapping.

Figures 2A, 2B:
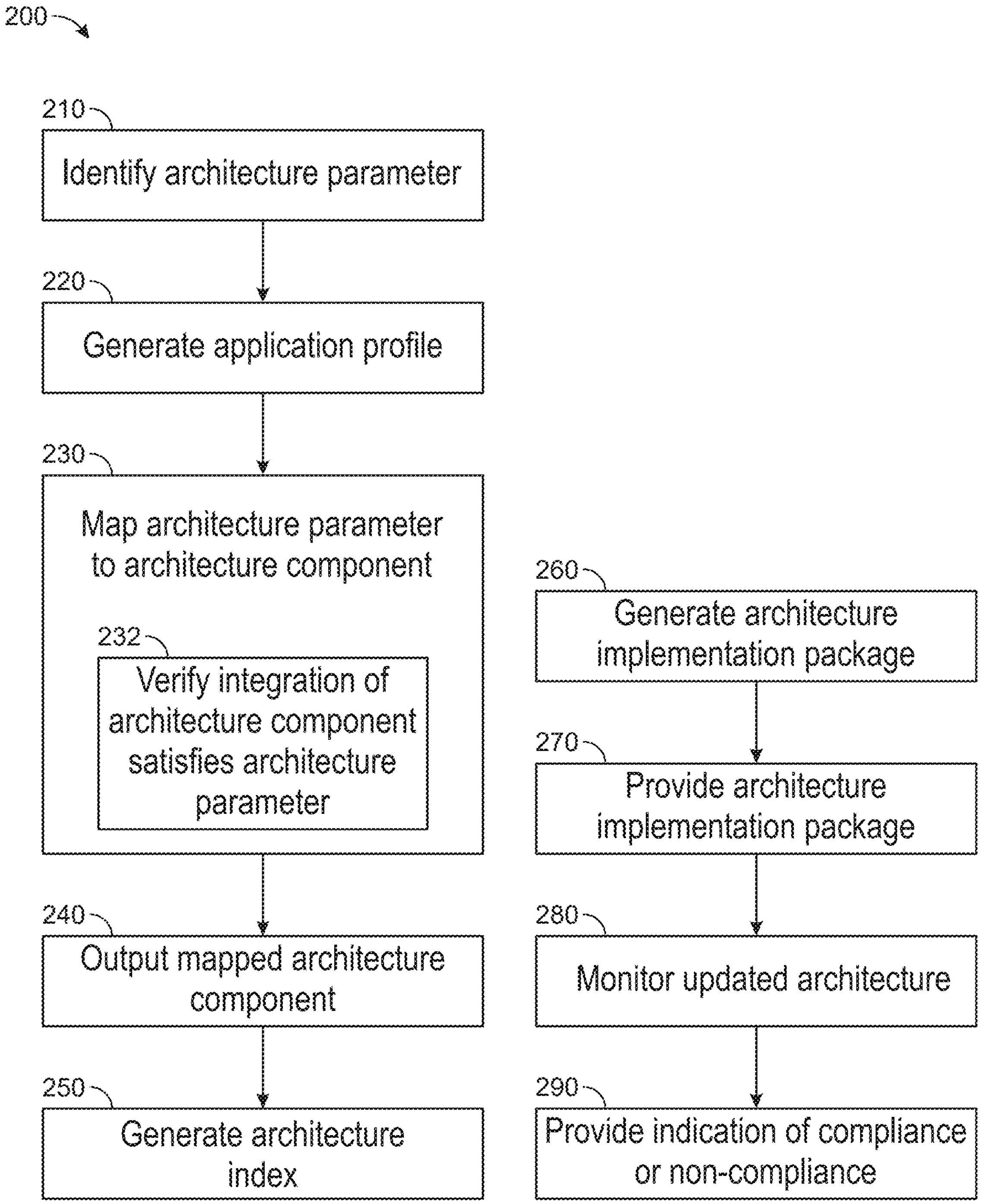
FIGS. 2A-2B are flowcharts for a computer-implemented method for dynamic architecture mapping, according to some embodiments.

Referring now to FIGS. 2A-2B, flow diagrams for a method 200 of dynamic architecture mapping is shown, according to some embodiments. One or more of the components of the computing environment 100 described with respect to FIG. 1 can be used to perform the steps of method 200. For example, the architecture governance system 110 can perform one or more of the steps of the method 200.

In a broad overview of method 200, at block 210, the one or more processing circuits (e.g., architecture governance system 110 in FIG. 1) can identify an architecture parameter. At block 220, the one or more processing circuits can generate an application profile. At block 230, the one or more processing circuits can map the architecture parameter to an architecture component, which can include the one or more processing circuits verifying an integration of the architecture component satisfies the architecture parameter at block 232. At block 240, the one or more processing circuits can output a mapped architecture component. At block 250, the one or more processing circuits can generate an architecture index. At block 260, the one or more processing circuits can generate an architecture implementation package. At block 270, the one or more processing circuits can provide the architecture implementation package. At block 280, the one or more processing circuits can monitor updated architecture. At block 290, the one or more processing circuits can provide an indication of compliance or non-compliance. Additional, fewer, or different operations can be performed depending on the particular arrangement. In some embodiments, some, or all operations of method 200 can be performed by one or more processors executing on one or more computing devices, systems, or servers. In some embodiments, each operation can be re-ordered, added, removed, or repeated.

At block 210, the one or more processing circuits can identify an architecture parameter. In some embodiments, the one or more processing circuits can identify at least one architecture parameter of an application based on at least one architecture framework. That is, identifying could include evaluating compatibility with current technology and security standards. In some embodiments, the processing circuits could analyze system requirements and operational constraints. The architecture parameter can include any requirement for an application (e.g., a software application, computer algorithm, module or function, code portion or fragment, user interface, etc.). For example, the architecture parameter may be maximum allowable downtime. In another example, the architecture parameter may be required response time for user queries. The architecture framework may include an individual or entity's list of requirements relating to software lifecycle development (e.g., interoperability requirements, data security requirements, legal and/or regulatory requirements, etc.). For example, an entity's list of requirements could be specified in a corporate IT policy document. In this example, a particular software development lifecycle could be for a financial transaction processing system. In some embodiments, at least one architecture parameter can be at least one of an entity requirement, a security requirement, or a security tolerance requirement. For example, the entity requirement could be compliance with international data protection laws. In another example, the software requirement could be integration with legacy systems. In yet another example, the security tolerance requirement could be tolerance for minor disruptions during non-peak hours.

In some embodiments, identifying the architecture component can include determining the application profile corresponding to the application failing to satisfy at least one architectural parameter. For example, an application profile may be a structured overview of the software's modules, interfaces, and data flows of financial and mortgage data. In this example, the application could be a high-frequency mortgage or trading platform. Additionally, identifying the architecture component can include identifying a plurality of candidate architectural components including the at least one architecture component. That is, a candidate architectural component could be, but is not limited to, scalable cloud storage options, encryption methods, data backup solutions, or any performance-enhancing middleware. For example, a candidate architectural component may be an SQL database with built-in redundancy. Identifying the architecture component can also include outputting the at least one architecture component based on comparing the plurality of candidate architectural components to the architecture of the application and determining a compatibility between the at least one architecture component and the architecture of the application. For example, the comparison could be based on throughput requirements and existing infrastructure. That is, the output may be a recommended database system optimized for the current application architecture.

At block 220, the one or more processing circuits can generate an application profile. In some embodiments, the one or more processing circuits can generate an application profile of the application based on the at least one architecture parameter. That is, the profile could serve as a reference document detailing how each component of the application aligns with the overarching architectural directives and/or be used for determining architecture parameters or corresponding components. For example, an application profile may be a mapping of all application components with respective compliance and performance metrics. In some embodiments, the architecture parameter can be used to generate the application profile by assessing each component's compliance against specified benchmarks. For example, the processing circuits can generate the application profile by aggregating data from system logs and user feedback.

At block 230, the one or more processing circuits can map the architecture parameter to the architecture component. In some embodiments, the one or more processing circuits can map the at least one architecture parameter to the at least one architecture component based on the application profile. For example, mapping could include aligning system capabilities with business objectives. In this example, the processing circuits can map the architecture parameter to the architecture component by prioritizing components based on criticality and impact on business operations. Furthermore, the application profile can be used to map. For example, the processing circuits can use the application profile to identify gaps and propose enhancements to ensure alignment with strategic goals. In some embodiments, mapping might include an interactive tool visually aligning an architecture component with an architecture parameter (e.g., using a GUI, such as GUIs 500A-500D of FIGS. 5A-5D).

At step 232 of block 230, the one or more processing circuits can verify an integration of the at least one architecture component in the application satisfies the at least one architecture parameter. For example, verifying could include facilitating performance and security testing. In some embodiments, determining the integration of the least one architecture component in the application satisfies the at least one architecture parameter can include determining that incorporating or embedding the at least one architecture component in the application causes the application to meet or exceed at least one predefined benchmark for functionality, performance, or compatibility. For example, incorporating the at least one architecture component in the application could include implementing a new distributed database system. In another example, embedding the at least one architecture component in the application could include adding a real-time analytics system or interface. In both examples, causing the application to meet or exceed at least one predefined benchmark for functionality, performance, or compatibility may include achieving faster data retrieval times and enhanced data security. For example, a predefined benchmark for functionality may be less than 1-second response time for queries. In another example, a predefined benchmark for performance may be handling 10,000 transactions per second. In yet another example, a predefined benchmark for compatibility may be seamless integration with existing CRM systems.

In some embodiments, the mapping can further include extracting a first data package from the at least one architecture component. For example, the first data package can include integration data corresponding with integrating the at least one architecture component in the application. Additionally, integrating can include updating an application deployment package of the application to include the at least one architecture component. In this example, the first data package may be configuration files and installation scripts. In some embodiments, the mapping can further include extracting a second data package from the at least one architecture parameter. For example, the second data package can include one or more criteria for verifying the integration of the at least one architecture component in the application satisfies the at least one architecture parameter. In this example, the second data package may be compliance requirements and technical specifications. In some embodiments, the mapping can further include generating a plurality of application states. For example, a first application state of the plurality of application states can be based on the application. In this example, the first application state may be prior to integration. In another example, a second application state of the plurality of application states can be based on integrating the at least one architecture parameter in the application. In this example, the second application state may be post-integration system performance.

In some embodiments, integrating can include applying the integration data simulating the incorporation of the at least one architecture component in the architecture of the application by executing the application deployment package. For example, integrating may include executing a series of automated deployment and rollback scenarios. In some embodiments, the mapping can further include comparing at least one of the first application state or the second application state to the one or more criteria to generate an architecture compliance index. For example, comparing may include analyzing operational metrics against established benchmarks. That is, the comparison may reveal deviations and align corrective actions. In some embodiments, the mapping can further include linking component data including the at least one architecture component with parameter data including the at least one architecture parameter. That is, linking can occur in response to the integration of the at least one architecture component in the application satisfying the at least one architecture parameter. For example, linking may include establishing data mappings and interface bindings. In this example, the component data may be system logs and change records.

In some embodiments, determining that the architecture compliance index complies with the at least one predefined benchmark can further include modeling, using an integration model, an integration efficiency or performance alignment of the application incorporating the at least one architecture component using the at least one predefined benchmark. For example, an architecture compliance index may be calculated based on aggregated performance data and compliance audit results. In this example, the architecture compliance index may be determined by comparing actual system performance against target compliance thresholds. In another example, an architecture compliance index could be a composite score reflecting both functional and non-functional system attributes. In this example, the architecture compliance index may be determined by weighted evaluations of system components according to their impact on overall system performance and compliance. Furthermore, the integration model may be a trained model and configured to predict system behavior under various configurations and workloads. For example, the integration model may be an AI neural network trained on historical performance data and known compliance failures. In this example, once the integration model is trained and deployed, the integration model can receive as input real-time system metrics and configuration changes.

Additionally, determining the architecture compliance index can further include outputting, by the one or more processing circuits using the integration model, output data corresponding with the integration efficiency or performance alignment. That is, the output of the integration model can be a detailed report highlighting areas of compliance and areas needing improvement. For example, integration efficiency may be expressed as the percentage of system resources utilized under peak load compared to optimal resource utilization. In another example, performance alignment may be measured by the time taken to adapt to new compliance standards. In both examples, the architecture compliance index can be determined, using the integration model, by calculating deviations from expected performance baselines and suggesting system adjustments for alignment.

At block 240, the one or more processing circuits can output at least one mapped architecture component corresponding to one or more selectable actions provided to a graphical user interface (GUI) for configuring an architecture of the application. For example, the mapped architecture component may be a visually represented module within the GUI that users can interact with to adjust settings or view detailed compliance and performance information. In some embodiments, the GUI can be provided for real-time monitoring and adjustments of system configurations. Furthermore, a selectable action may be selecting different compliance standards to simulate their impact on the system. In some embodiments, outputting can include determining the integration of the at least one architecture component of the plurality of mapped architecture components in the application satisfies the at least one architecture parameter. For example, to satisfy an architecture parameter, the determined integration may be validated through a series of stress tests and compliance checks. In this example, adjustments are made dynamically based on test outcomes. Furthermore, outputting can also include identifying the at least one architecture component based on comparing the at least one architecture component to the plurality of mapped architecture components. For example, identifying may include evaluating compatibility and performance synergies between components. In this example, the architecture component may be a newly integrated data management platform. Additionally, the mapped architecture component may be listed with key performance indicators and compliance metrics. Thus, comparing may include cross-referencing new component capabilities with existing system demands.

At block 250, the one or more processing circuits can generate an architecture index of the application corresponding to a plurality of mapped architecture components. Thus, the architecture index may be a dashboard displaying real-time metrics, compliance statuses, and system health indicators. In some embodiments, the architecture index may be a quantitative representation of the alignment of system components with strategic goals and compliance requirements. For example, an architecture index of the application may include a scorecard or other quantitative index for evaluating an application's compliance with architecture parameters or for mapping architecture components to architecture parameters. In some embodiments, the architecture index can be indicative of overall system robustness and readiness for scaling. Furthermore, the GUI provided could include the architecture index. For example, the GUI may include interactive charts and real-time alerts. In another example, the GUI may include configurable panels that allow users to focus on specific components or metrics.

In some embodiments, the processing circuits can monitor the application for an update to the architecture. For example, the update can include a modification to the at least one architecture parameter, to at least one of the plurality of mapped architecture components, or the architecture of the application. In some embodiments, monitoring may include tracking version changes and configuration updates across the system. For example, an update in an architecture can be identified from monitoring by analyzing change logs and update notifications. In this example, the update may be the implementation of a new security protocol across all modules. Furthermore, the processing circuits can determine the modification to the at least one architecture parameter, to at least one of the plurality of mapped architecture components, or architecture of the application causes the application to fail to satisfy the at least one architecture parameter. For example, a modification to the at least one architecture parameter may be the increase of data encryption standards. In another example, a modification to at least one of the plurality of mapped architecture components may be the upgrade of a central processing unit that alters processing speeds and affects system performance benchmarks. In yet another example, an architecture of the application causing the application to fail to satisfy the at least one architecture parameter may be the integration of a new API that is not fully compatible with the existing data management system. Additionally, determining can be in response to identifying the update to the architecture. In some embodiments, the mapping and the outputting is executed by the one or more processing circuits in response to the integration of the at least one architecture component in the application satisfying the at least one architecture parameter.

At block 260, the one or more processing circuits can generate an architecture implementation package. In some implementations, at block 260, the one or more processing circuits can, in response to receiving a selection of the one or more selectable actions provided to the GUI, generate an architecture implementation package. For example, the architecture implementation package may include configuration scripts, resource allocation templates, integration guidelines, setup instructions, deployment configurations, compliance checklists, and other various tools or software modules for determine architectural compliance of the application. In one example, architecture parameters may be encoded as computer-executable (e.g., software) code (e.g., architecture code), and the one or more processing circuits may execute the architecture code to determine that the architecture is in a compliant or non-compliant state. In another example, the one or more processing circuits may execute or provide (e.g., to a user via a GUI) an interactive configuration interface to create the package by receive user input selecting compatible architecture components from available options (e.g., included in a drop down list, etc.). In some implementations, the architecture implementation package includes the at least one mapped architecture component configured to integrate with the architecture of the application. For example, the mapped architecture component may include middleware services, data processing modules, or user authentication systems (e.g., message brokers, ETL processes, OAuth services) to integrate with an application development environment of the application. In another example, the architecture implementation package may include predefined templates and scripts for integrating third-party services (e.g., payment gateways, analytics tools) to improve application functionality while maintaining architectural consistency. In another example, the architecture implementation package can include containerized microservices that can be deployed within an application (e.g., into an existing container orchestration system of an application, etc.) to facilitate the integration or implementation of the mapped architecture component into the architecture of the application (e.g., adding new software modules, replacing modules, adjusting parameters etc.).

At block 270, the one or more processing circuits can provide the architecture implementation package. In some implementations, at block 270, the one or more processing circuits can provide the architecture implementation package to an application deployment system (e.g., architecture governance system 110 of FIG. 1, etc.) to integrate the at least one mapped architecture component of the architecture implementation package into the architecture of the application. For example, integration may include one or more processing circuits deploying the mapped architecture components using automated deployment techniques and/or processes (e.g., deployment scripts, configuration management tools, integration protocols) for providing a mapped architecture component configured to integrate with architecture of the application. In another example, providing the architecture implementation package may include the one or more processing circuits transferring the package to the deployment system via a secure API. Further, providing may include the one or more processing circuits utilizing a continuous integration/continuous deployment (CI/CD) pipeline to deliver the architecture implementation package automatically to the deployment system to facility consistent and/or repeatable provisioning of architecture and/or architecture components (e.g., continuous monitoring, continuous architecture review, etc.). In another example, the one or more processing circuits may upload the architecture implementation package to a centralized repository (e.g., cloud storage, internal server), and a deployment system can access and retrieve the components, configuration files, and/or other data for component integration. For example, providing the architecture implementation package may include the one or more processing circuits sending the package via a secure file transfer protocol (e.g., SFTP, HTTPS) to an application deployment system or other computing system for deployment. In another example, the one or more processing circuits may deliver the architecture implementation package in a message or an attachment of a message to a user, and the user may provide the package and architecture to a with encrypted files and digital signatures (e.g., PGP, S/MIME). In another example, the one or more processing circuits may store the architecture implementation package on a network or networked-device (e.g., network-attached storage (NAS) device (e.g., shared drives, file servers)) for local or remote (e.g., cloud-based) access by a deployment system.

At block 280, the one or more processing circuits can monitor updated architecture. In some implementations, at block 280, in response to implementing the at least one mapped architecture component, the one or more processing circuits can monitor an updated architecture of the application to detect architecture deviations. For example, the updated architecture may include an original architecture (e.g., architecture without an identified or mapped architecture component being integrated) in addition to the new architecture including updated, added, modified, or implemented components (e.g., mapped components identified for satisfying or complying with various software development requirements). In an example, monitoring may include the one or more processing circuits identifying deviations, changes, or other departures from a predefined architecture framework (e.g., collection of architecture parameters or requirements). Further, monitoring may include the one or more processing circuits performing drift detection. For example, drift detection may include continuously analyzing data (e.g., application state data, application use data, user data of users of the application, etc.) to identify discrepancies between an intended architecture state and an actual (e.g., deployed state). For example, the one or more processing circuits may perform configuration checks, system audits, real-time analysis, anomaly detection, and other performance monitoring processes and/or techniques to determine updates (e.g., detected drift, compliant or non-compliant architecture, updated architecture components or mapped components) corresponding to the architecture (e.g., in a time period following the implementation of an identified mapped architecture component into the architecture of the application). In some implementations, monitoring may further include comparing the updated architecture of the application to the at least one architecture parameter. For example, monitoring may include the one or more processing circuits examining various logs, databases, or other data sources corresponding to the application for modification or drift including unauthorized changes, spikes in network traffic, and/or technological errors (e.g., CPU, memory, and storage utilization errors, etc.) and determining, based on the examination, that the updated architecture satisfies or adheres to architecture guidelines (e.g., one or more architecture parameter). In another example, comparing may include validating an alignment between the one or more architecture components (e.g., mapped components) and an intended (e.g., simulated and verified) state of the application.

At block 290, the one or more processing circuits can provide an indication of compliance or non-compliance. In some implementation, at block 290, the one or more processing circuits can provide an indication of compliance or non-compliance to the GUI based on the monitoring. In one example, an indication may be an icon, content item, message, pop-up window, drop-down list, or other user interface element of a GUI (e.g., a visual representation of a component with check boxes indicating compliance non-compliance). In another example, a non-compliance indication could be a red warning icon accompanied by a detailed message (e.g., "Non-compliant architecture," "Detected error," etc.). Further, a compliance indication could be an alert banner on the dashboard (e.g., "Integration Success," "Compliant Architecture," "Architecture Aligns with Parameters," etc.). In an example, providing includes the architecture identification system 112 outputting or updating content, icons, graphics, user-interactive features, and/or various other graphical user interface items to indicate the integration of the mapped component causes the application to be in a compliant (e.g., satisfactory) state or a non-compliant state (e.g., unsatisfactory state). Further, providing an indication may include the one or more processing circuits generating or creating a summary report (e.g., compliance report, error log, etc.) to outline compliance status and/or detected drift or issues and presenting the report via the GUI. For example, the one or more processing circuits may trigger an automated notification (e.g., email, SMS, etc.) to relevant stakeholders in response to detected drift with information of the compliance status (e.g., compliance summary, non-compliance details). In another example, the one or more processing circuits may provide an interactive dashboard widget to display various compliance metrics and/or trends over time (e.g., compliance graph, historical compliance data, etc.).

Figure 3:
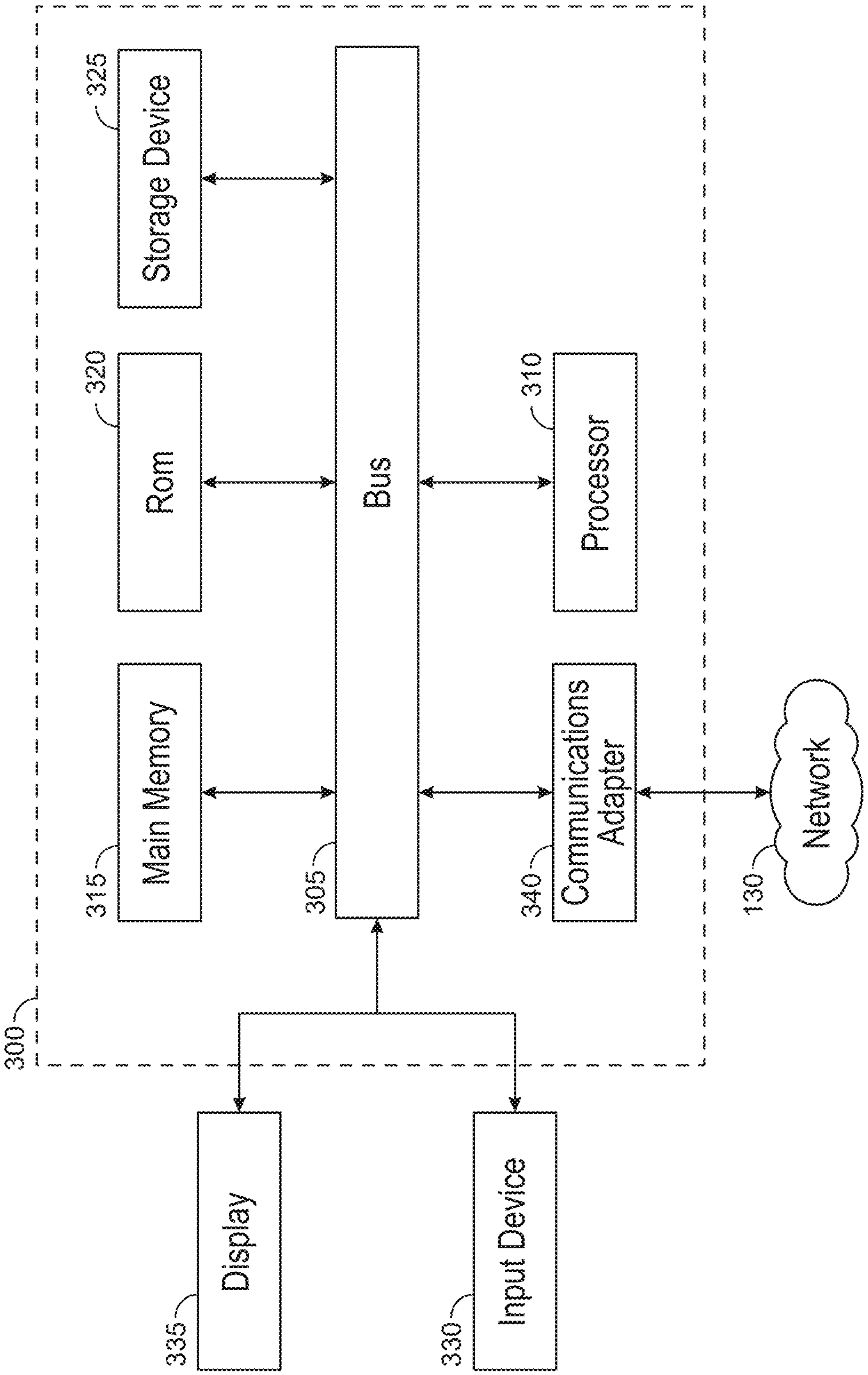
FIG. 3 is a block diagram illustrating an example computing system suitable for use in the various arrangements described herein, according to some embodiments.

FIG. 3 illustrates a depiction of a computer system 300 that can be used, for example, to implement an illustrative architecture governance system 110, an illustrative database 120, an illustrative user computing system 140, illustrative data sources 150, and/or various other illustrative systems described in the present disclosure. The computing system 300 includes a bus 305 or other communication component for communicating information and a processor 310 coupled to the bus 305 for processing information. The computing system 300 also includes main memory 315, such as a random-access memory (RAM) or other dynamic storage device, coupled to the bus 305 for storing information, and instructions to be executed by the processor 310. Main memory 315 can also be used for storing position information, temporary variables, or other intermediate information during execution of instructions by the processor 310. The computing system 300 can further include a read only memory (ROM) 320 or other static storage device coupled to the bus 305 for storing static information and instructions for the processor 310. A storage device 325, such as a solid-state device, magnetic disk or optical disk, is coupled to the bus 305 for persistently storing information and instructions.

The computing system 300 can be coupled via the bus 305 to a display 335, such as a liquid crystal display, or active matrix display, for displaying information to a user. An input device 330, such as a keyboard including alphanumeric and other keys, can be coupled to the bus 305 for communicating information, and command selections to the processor 310. In some embodiments, the input device 330 has a touch screen display 335. The input device 330 can include a cursor control, such as a mouse, a trackball, or cursor direction keys, for communicating direction information and command selections to the processor 310 and for controlling cursor movement on the display 335.

In some embodiments, the computing system 300 can include a communications adapter 340, such as a networking adapter. Communications adapter 340 can be coupled to bus 305 and can allow communications with a computing or communications network 130 and/or other computing systems. In some embodiments, any type of networking configuration can be achieved using communications adapter 340, such as wired (e.g., via Ethernet), wireless (e.g., via Wi-Fi, Bluetooth, etc.), pre-configured, ad-hoc, LAN, WAN, etc.

In some embodiments, the processes that effectuate illustrative implementations that are described herein can be achieved by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement can also be employed to execute the instructions contained in main memory 315. In some embodiments, hard-wired circuitry can be used in place of or in combination with software instructions to implement illustrative implementations. Thus, implementations are not limited to any specific combination of hardware circuitry and software.

Although an example processing system has been described in FIG. 3, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Figure 4A:
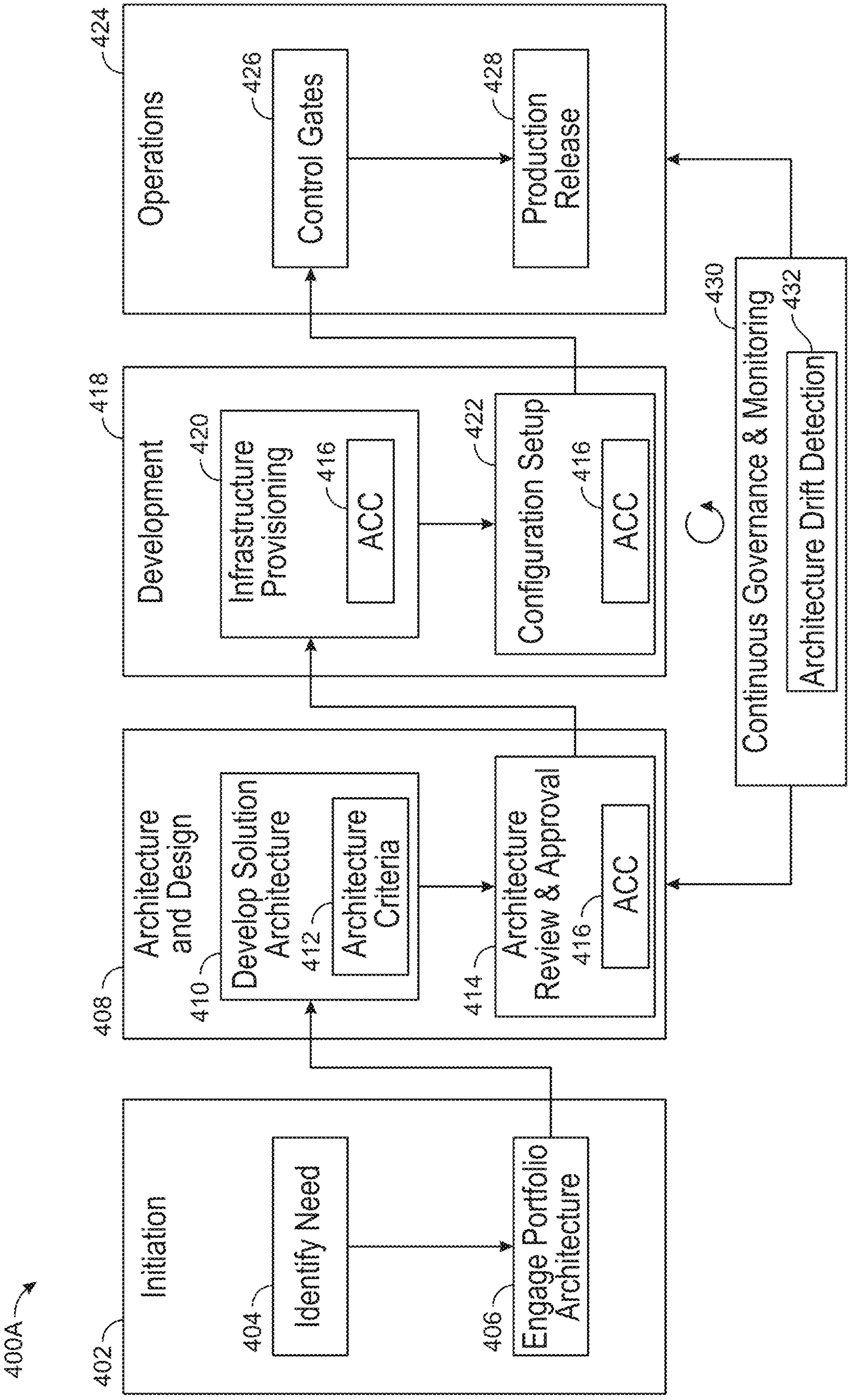
FIGS. 4A-4C are illustrative examples of computer-implemented methods for dynamic architecture mapping, according to some embodiments.
Figure 4B:
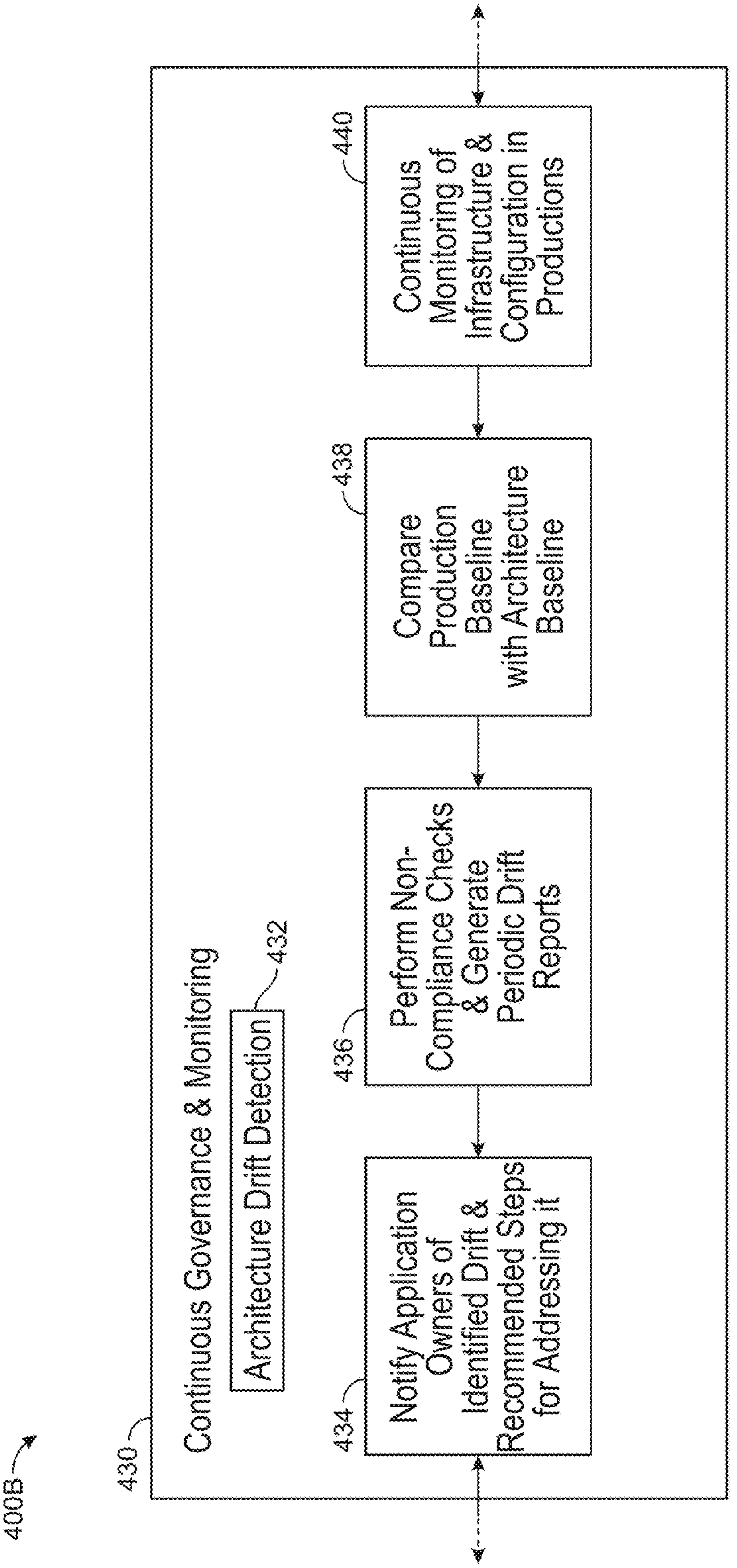
Figure 4C:
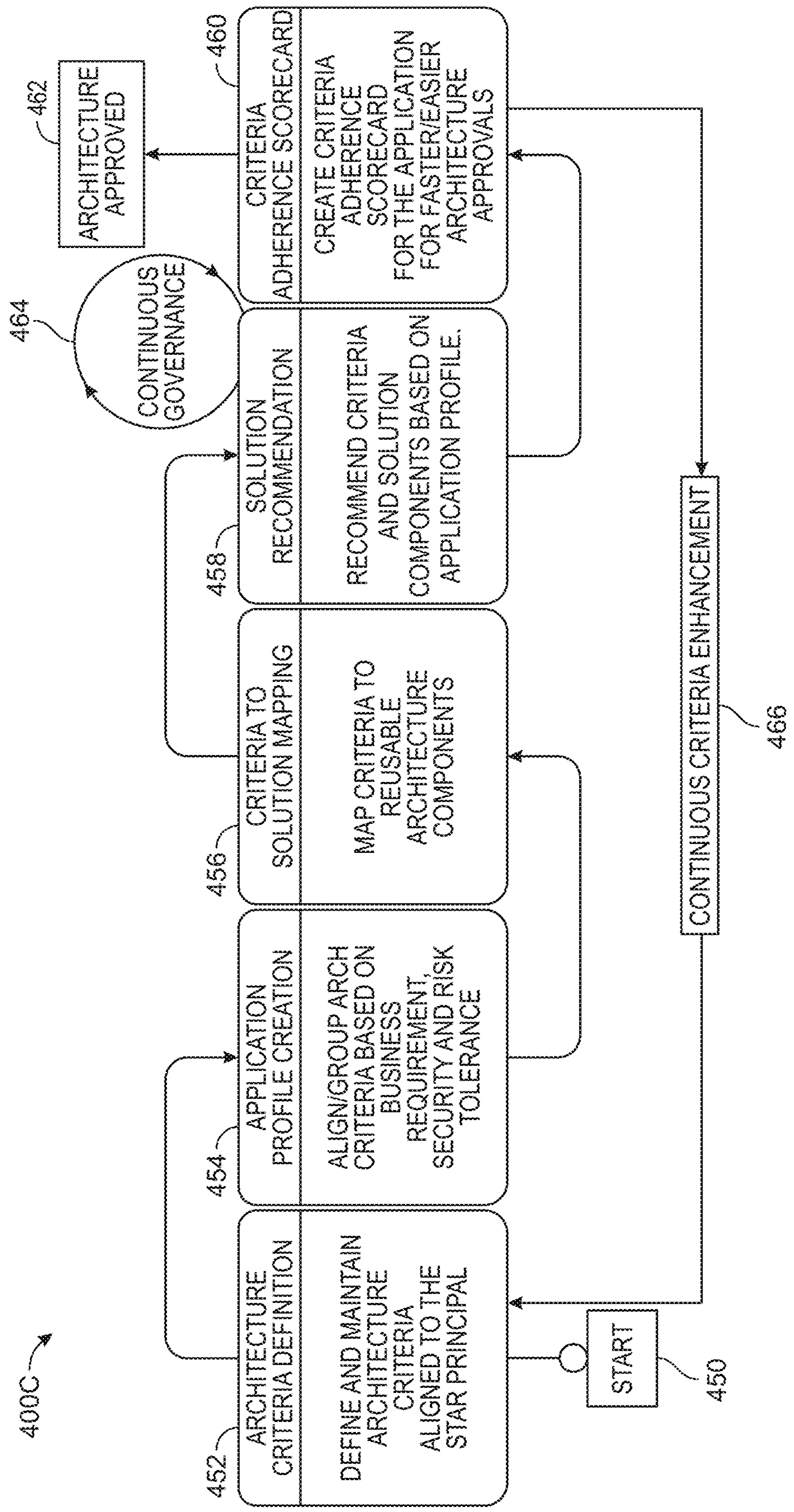

Referring now to FIGS. 4A-4C, illustrative examples of computer-implemented methods for dynamic architecture mapping are shown, according to some embodiments. Additional, fewer, or different operations (e.g., steps, blocks, etc.) including methods 400A-400C of FIGS. 4A-4C can be performed depending on the particular arrangement. In some embodiments, some, or all operations of method 400A can be performed by one or more processors executing on one or more computing devices, systems, or servers. In some embodiments, each operation can be re-ordered, added, removed, or repeated. Referring to FIG. 4A in more detail, a method 400A for application development with continuous architecture governance is shown. In a broad overview of FIG. 4A, the method 400A may include an initiation block 402, an architecture and design block 408, a development block 418, and an operations block 424, and a continuous governance and monitoring block 430.

In some embodiments, the initiation block 402 may include one or more processing circuits identifying a need (e.g., architectural parameter that is not satisfied by architecture of an application) at block 404 and engaging a portfolio architecture at block 408. For example, the one or more processing circuits may identify an architecture parameter of an application based on an architecture framework at block 404 by determining an unsatisfied architectural requirement (e.g., failure to implement proper encryption standards) indicated via a scorecard or index (e.g., an application dataset including information related to application architecture). In another example, the one or more processing circuits may engage a portfolio architecture at block 406 by selecting appropriate architectural components (e.g., modular encryption software) to satisfy the identified architectural parameters (e.g., to enhance or improve compliance with the overall architecture framework).

Still referring to FIG. 4A, the architecture and design block 408 may include the one or more processing circuits developing a solution architecture at block 410 using architecture criteria 412. For example, the one or more processing circuits may utilize architecture parameters and/or criteria such as scalability, security, and interoperability (e.g., facilitating communication with existing systems without data loss or corruption) to develop an overall application framework. In some embodiments, the architecture and design block 412 may further include the one or more processing circuits performing architecture review and approval at block 414. For example, the review may include determining that all architecture components meet predefined performance benchmarks (e.g., load testing to verify system behavior under peak traffic conditions). In some embodiments, block 414 may further include implementing one or more architecture parameters (e.g., application requirements, etc.) as code (e.g., converting architectural design elements into executable instructions for improved system functionality).

In some embodiments, the development block 418 may include the one or more processing circuits performing infrastructure provisioning at block 420 using encoded architecture and/or architecture parameters (e.g., ACC 416). For example, the processing circuits may configure an application or application-related software such as server environments and database schemas to support the deployment of a new application feature. Additionally, provisioning could include integrating development and operation tools to support continuous integration and continuous deployment pipelines (e.g., automating builds and tests through Jenkins or GitLab CI/CD pipelines based on the architectural requirements). In some embodiments, the development block 418 may include the one or more processing circuits performing configuration setup at block 422 (e.g., using ACC 416). For example, block 418 may include configuring application servers and middleware for compatibility with updated security protocols (e.g., updating SSL/TLS configurations on web servers to enhance secure communication). In another example, block 418 (e.g., configuration setup block 422) may include establishing or generating development environments for architectural design by integrating tools and systems that facilitate a continuous integration and delivery pipelines (e.g., setting up Jenkins for automated builds and testing).

Still referring to FIG. 4A, the operations block 424 may include the one or more processing circuits managing control gates at block 426. For example, this may include conducting thorough checks and validations at various stages of application deployment to determine that each component meets the specified architectural parameters and criteria. Control gates could include automated and manual review processes to validate integration points and dependencies (e.g., API compatibility tests to determine that new or updated APIs function correctly within the existing application ecosystem). Additionally, these control gates may serve as "checkpoints" and enforce compliance with security standards and performance requirements before moving forward in the deployment pipeline.

In some embodiments, the operations block 424 may further include the one or more processing circuits, at production release block 428, facilitating the final deployment of the application into a production environment. For example, block 428 may include deploying application components and/or mapped architecture components and determining that the release meets operational benchmarks (e.g., deploying the application through blue-green deployment strategies to minimize downtime and risk). Moreover, the production release block 428 may include final validations such as load and stress testing to determine that the application performs sufficiently in real-world conditions and scales appropriately under peak loads (e.g., simulating user traffic to validate application responsiveness and resource utilization).

Still referring to FIG. 4A, the continuous governance and monitoring block 430 may include performing architectural drift detection at block 432. For example, the one or more processing circuits may periodically or semi-periodically identify architecture parameters by which the application (e.g., the application architecture) does not comply and further identify architecture components to integrate within the application and cause the application to satisfy the architecture parameter(s). Both the continuous governance and monitoring block 430 and architectural drift detection at block 432 are described in greater detail regarding FIG. 4B below.

Referring now to FIG. 4B, the method 400B illustrates a detailed flowchart of the continuous governance and monitoring block 430, according to some embodiments. In a broad overview of the method 400B, the continuous governance and monitoring block 430 may include the one or more processing circuits performing architecture drift detection at block 432, which may include performing continuous monitoring of infrastructure and/or configurations in production at block 440, comparing a production baseline with an architecture baseline at block 438, performing non-compliance checks and generating drift reports at block 436, and notifying application owners at block 434.

In some embodiments, the one or more processing circuits may perform architecture drift detection at block 432 by continuously monitoring the application to identify deviations or "drift" from the defined architecture parameters or standards that were established during the initial design and development phases. For example, the one or more processing circuits may evaluate whether updates or modifications made to the application (e.g., before release, post-release, etc.) have introduced changes that diverge from original security protocols, data flow architectures, or performance specifications. For instance, block 432 may including assessing if recent updates have bypassed previously implemented encryption methods or altered data routing mechanisms that could affect the structural integrity of the application. Additionally, the processing circuits can monitor for unintended changes in software dependencies that can lead to security vulnerabilities, such as outdated libraries or frameworks that no longer meet established security standards (e.g., architecture parameters).

In some embodiments, performing architecture drift detection at block 432 may include the one or more processing circuits continuously monitoring infrastructure and configuration (e.g., of an application) in production at block 440. For example, this process may include tracking changes in server configurations, network settings, and software updates to detect any deviations from predefined architectural standards that could impact system performance or security. Additionally, monitoring at block 440 can include examining environmental variables such as hardware performance and system load conditions to determine alignment or non-alignment with scalability and resilience parameters (e.g., set during the architecture design phase).

In some embodiments, the one or more processing circuits may compare a production baseline with an architecture baseline at block 438. For example, this comparison may include analyzing current operational data against initial design metrics to identify discrepancies that may constitute architectural drift, such as deviations in throughput levels, response times, or compliance with data security guidelines. Further comparisons at block 438 can include reviewing the integration of new software modules or updates against the original architecture documentation to verify that no unauthorized capabilities or dependencies are introduced.

In some embodiments, the one or more processing circuits may perform non-compliance checks at block 436. For example, these checks can include verifying that all system components adhere to regulatory standards and architectural requirements. In some embodiments, the one or more processing circuits can also generate periodic drift reports at block 436, which document any identified issues, their potential impacts on system functionality or security, and recommended corrective actions to realign the application with its intended architectural design. These reports can also track the frequency and severity of non-compliance issues to help prioritize corrective actions and improve continuous governance and compliance systems.

Still referring to FIG. 4B, performing architecture drift detection at block 432 may include the one or more processing circuits notifying application owners of identified drift at block 434. For example, the processing circuits might send automated alerts or detailed reports (e.g., periodic drift reports generated at block 436) via email or through a dashboard interface to stakeholders, detailing the nature and/or implications of the drift (e.g., data privacy concerns, functionality problems, etc.). In some embodiments, block 434 may further include the one or more processing circuits recommending steps for addressing identified architecture drift. For example, the processing circuits might suggest realigning the drifted components to comply with the original architecture parameters or updating the architectural documentation to reflect the new state if the drift aligns with strategic changes or improvements. In other examples, the processing circuits may suggest mapping new components to the architecture to rectify deviations (e.g., to cause the application to satisfy the architecture parameters).

Referring now to FIG. 4C, a method 400C for architecture design with continuous governance is shown, according to some embodiments. As shown, the method 400C may include architecture criteria definition block 452, application profile creation block 424, criteria to solution mapping clock 456, solution recommendation block 458, criteria adherence scorecard block 460, architecture approved block 462, continuous governance block 464, and continuous criteria enhancement block 466. In some implementations, the architecture criteria detection block 452 may include the one or more processing circuits defining and maintain architecture criteria aligned to a principle (e.g., STAR principle for specific, testable, automatable, and repeatable criteria implemented as code). For example, the architecture criteria (e.g., architecture parameters) may be defined by an entity/organization or automatically (e.g., by interpreting natural language requirements into testable code).

Still referring to FIG. 4C, the application profile creation block 454 may include the one or more processing circuits aligning or grouping architecture criteria (e.g., parameters) with similar parameters. For example, the one or more processing circuits may align or group the architecture parameters of an application based on one or more of a business requirement, a security requirement, and/or a risk tolerance requirement to create an application profile of the application (e.g., for use when determining components to map to parameters). In some embodiments, the criteria to solution mapping block 456 may include the one or more processing circuits mapping criteria (e.g., architecture parameters) to reusable architecture components. For example, the one or more processing circuits may map parameters and components by verifying an integration of the at least one architecture component in the application satisfies the at least one architecture parameter.

In some embodiments, the solution recommendation block 458 may include the one or more processing circuits recommending criteria and solution components based on the application profile generated at block 454. For example, the processing circuits may suggest architectural components that fulfill and/or cause the application to fulfill (or satisfy) identified requirements within the application profile, such as scalability solutions for handling increased user load or security measures for data protection (e.g., implementing certain encryption protocols to meet security criteria).

Still referring to FIG. 4C, the architecture approved block 462 may include the one or more processing circuits determining that the architecture of the application aligns with an architecture framework. For example, this determination can be based on a comparison of the application's architecture against established framework standards and verifying that all components, from data handling to user interface design, comply with the architectural guidelines (e.g., verifying compliance with cloud-first and mobile-first strategies in corporate IT policies). In some embodiments, the continuous criteria enhancement block 466 may include the one or more processing circuits updating and refining architecture criteria to adapt to evolving technological standards and business goals. For example, this process may include integrating new industry standards into existing architecture criteria to maintain relevance and effectiveness in addressing contemporary challenges (e.g., incorporating emerging AI and machine learning technologies to enhance automation and analytic capabilities within the architecture framework).

Figure 5A:
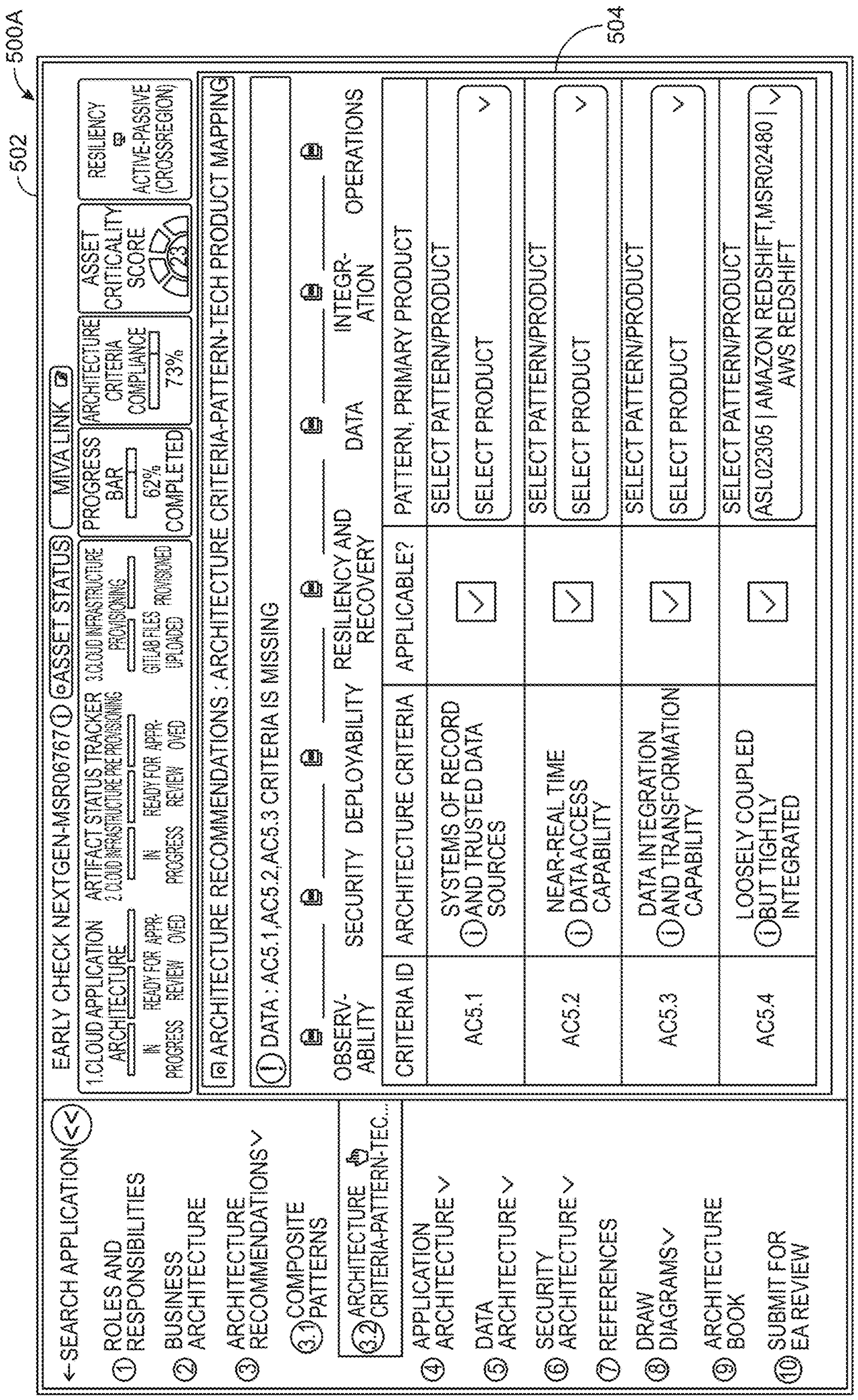
FIGS. 5A-5D are a block diagrams depicting an implementation of a system for dynamic architecture mapping incorporating various features and functionality of the systems of FIG. 1, according to some embodiments.

Referring now to FIGS. 5A-5D, block diagrams depicting an implementation of a system for dynamic architecture mapping incorporating various features and functionality of the systems of FIG. 1 are shown, according to some embodiments. Referring to FIG. 5A specifically, an illustrative graphical user interface (GUI) 500A is shown, according to some embodiments. The GUI 500A may include various features 502, such as content fields (e.g., for presenting information to a user), user inputs (e.g., check boxes, drop down lists, search bars), and other interactive or passive features/elements (e.g., selectable actions). In some embodiments, the features 502 of the GUI 500A may include a mapped content field 504. For example, the mapped content field 504 may include architecture parameter/criteria information, such as a list including architecture criteria and mapped architecture components for each architecture criteria (e.g., matching patterns or products). Users may interact with the mapped content field 504 to integrate and/or to simulate the integration of the mapped architecture component into the application, to select different or updated patterns/products (e.g., components), and more. For example, the GUI 500A (e.g., mapped content field 504) may include one or more selectable actions provided to a graphical user interface (e.g., GUI 500) for configuring an architecture of the application.

Figure 5B:
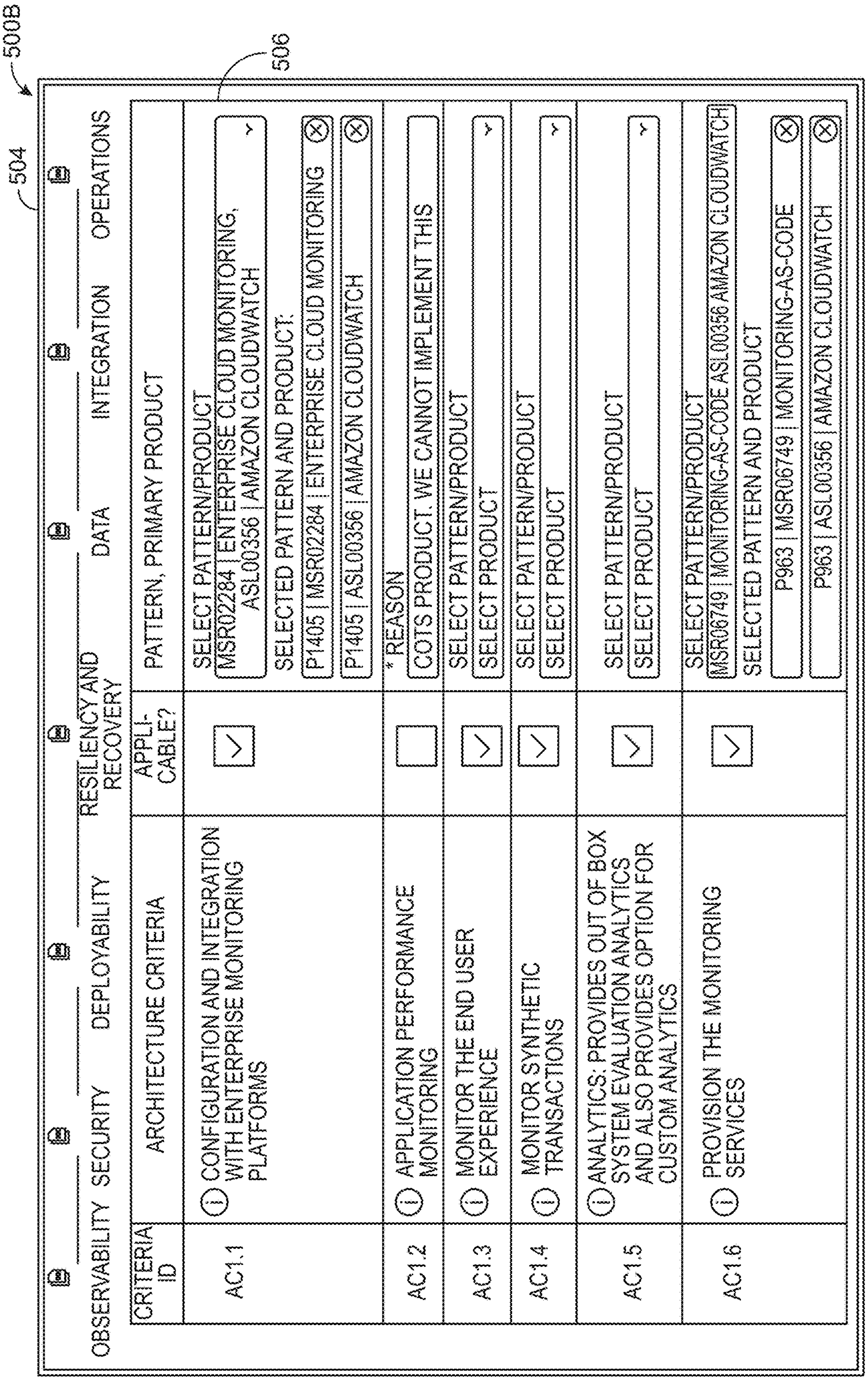

Referring now to FIG. 5B, an illustrative graphical user interface (GUI) 500B is shown, according to some embodiments. As described regarding the GUI 500A of FIG. 5A, the GUI 500B may include various features 502, such as content fields (e.g., for presenting information to a user), and user inputs (e.g., check boxes, drop down lists, search bars). For example, the GUI 500B may include the mapped content field 504. In some embodiments, the mapped content field 504 may further include a selectable list of architecture components 506 (e.g., MSR02284/enterprise cloud monitoring) for a user to select to be incorporated with an application (e.g., to cause the application to satisfy the architecture parameter including within the mapped content field 504 and corresponding to selectable list of architecture components 506).

Figure 5C:
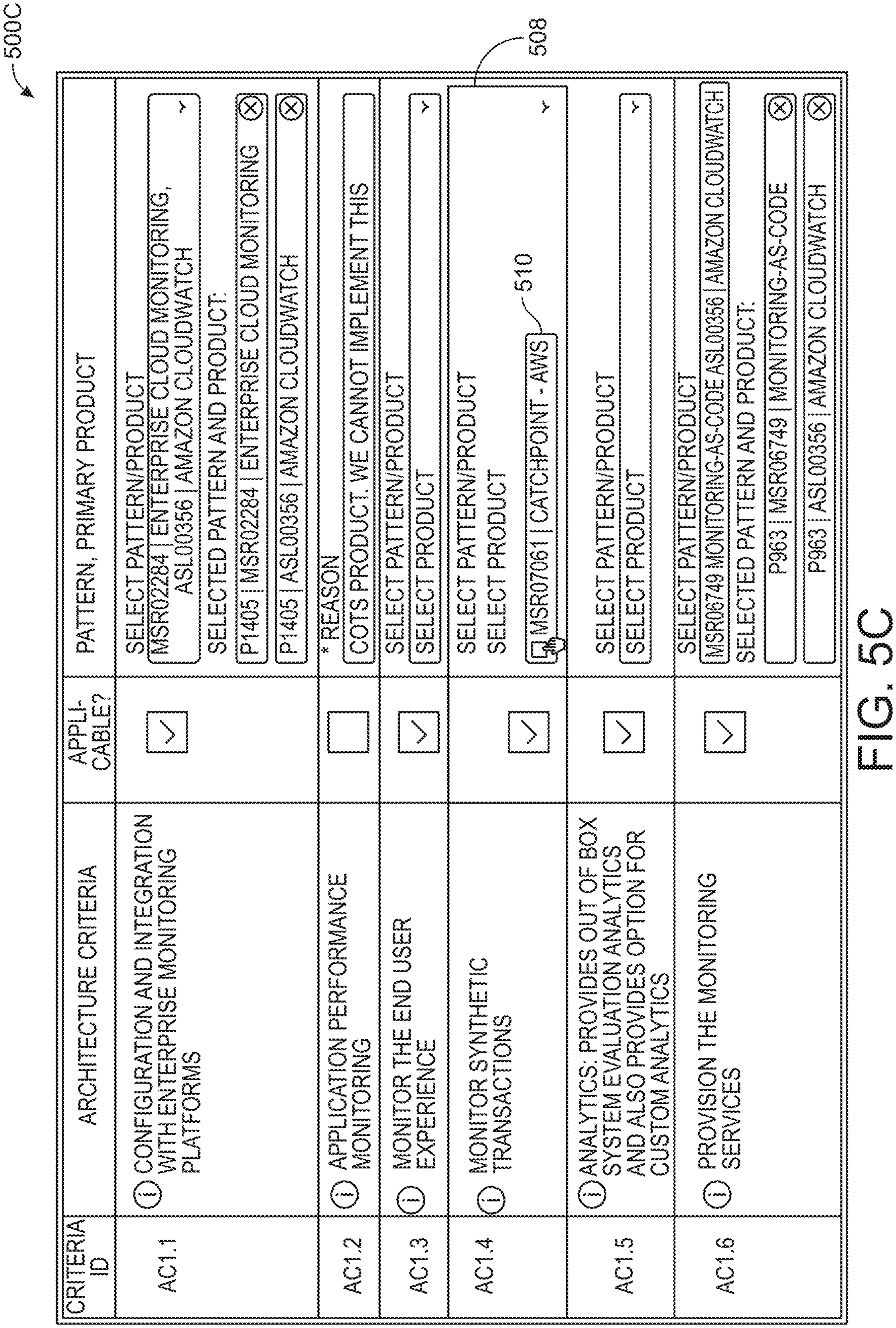

Referring now to FIG. 5C, an illustrative graphical user interface (GUI) 500C is shown, according to some embodiments. The GUI 500C may include a content field 508 including a single architecture parameter field and mapped architecture component field. For example, the architecture parameter field may include a requirement to "monitor synthetic transactions," and the corresponding mapped architecture component field may include a list of architecture components, including various software functions, application, and/or code packages (e.g., MSR07061/Catchpoint AWS, etc.). As shown on FIG. 5C, a checkbox included on the GUI 500 may indicate whether the mapped component is applicable to the architecture parameter (e.g., checked if applicable).

Figure 5D:
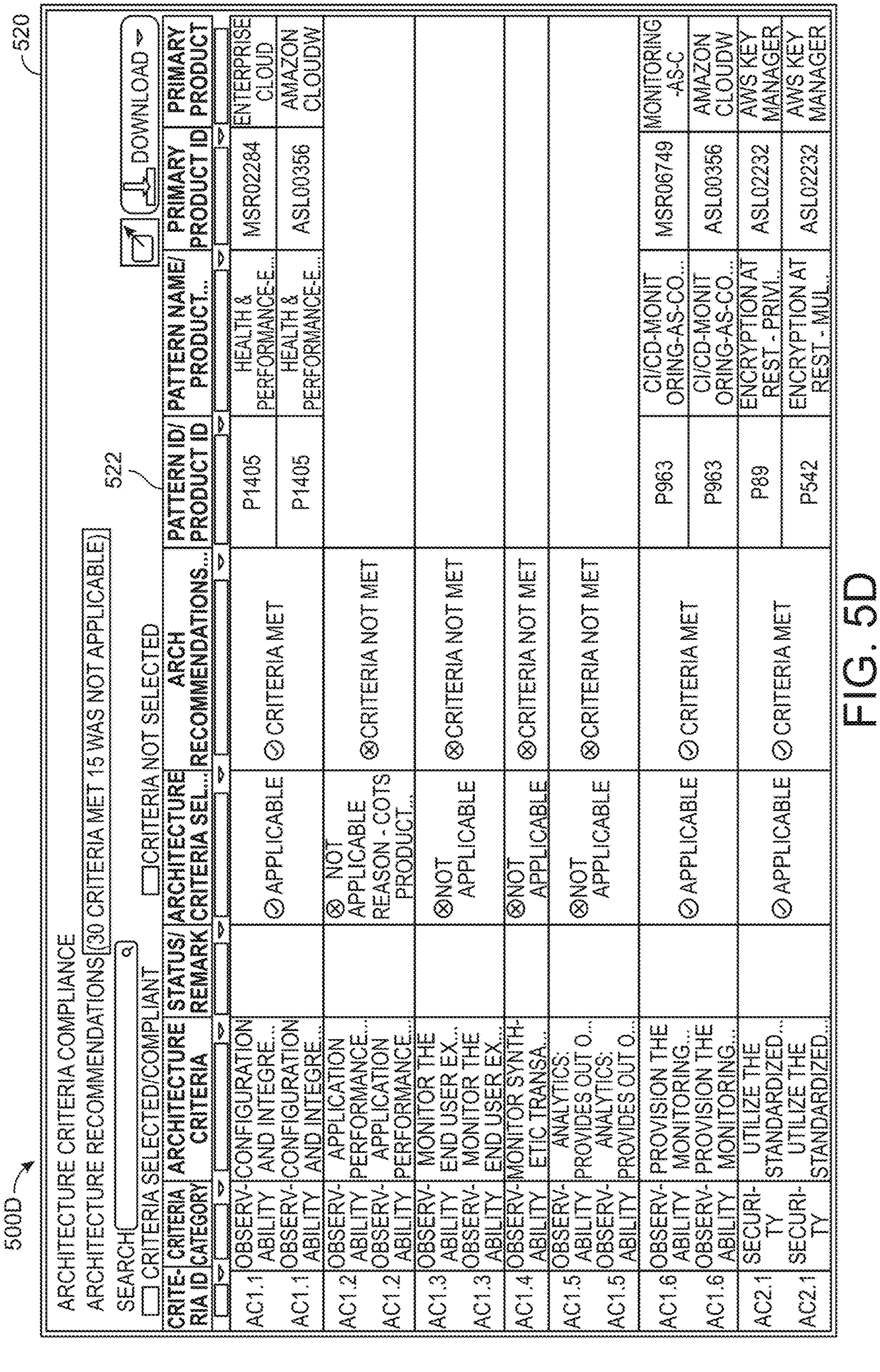

Referring now to FIG. 5D, an illustrative graphical user interface (GUI) 500D is shown, according to some embodiments. For example, the GUI 500D may include an architecture criteria compliance index 520 (e.g., mapped content field 504 of FIGS. 5A-5C) including various content fields for displaying information and user inputs for receiving information (e.g., architecture and/or application data). The architecture compliance index 520 may include a table 522 including a detailed listing of mapped architecture parameters and components, including tabular data such as an architecture criteria (or parameter) identifiers (ID), criteria categories, architecture criteria summaries, statuses/remarks, architecture criteria selection information (e.g., application or not applicable, optionally including further explanation), architecture component recommendations (e.g., summary of whether the architecture criteria/parameter would be satisfied or not satisfied based on an integration of a specific product within the application), and pattern/product identifiers, names, codes, and related entities (e.g., for identifying architecture components). Users may interact with the features (e.g., mapped architecture components) included on the table 522 for configuring architecture of an application.

Although an example processing system has been described in FIG. 1, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks, distributed ledger networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for dynamic architecture mapping using at least one architecture framework of an application, the method comprising:

identifying, by one or more processing circuits, at least one architecture parameter of the application based on the at least one architecture framework of the application;

generating, by the one or more processing circuits, an application profile of the application based on the at least one architecture parameter of the application;

mapping, by the one or more processing circuits and based on the application profile of the application, the at least one architecture parameter of the application to at least one architecture component, wherein mapping the at least one architecture parameter of the application to at least one architecture component comprises verifying an integration of the at least one architecture component in the application satisfies the at least one architecture parameter of the application;

outputting, by the one or more processing circuits, at least one mapped architecture component corresponding to one or more selectable actions provided to a graphical user interface (GUI) for configuring an architecture of the application;

generating, by the one or more processing circuits, an architecture index of the application corresponding to a plurality of mapped architecture components provided to the GUI for evaluating the architecture of the application;

in response to receiving a selection of the one or more selectable actions provided to the GUI, generating, by the one or more processing circuits, an architecture implementation package, wherein the architecture implementation package comprises the at least one mapped architecture component configured to deploy within the application and integrate with the architecture of the application;

deploying, by the one or more processing circuits, the architecture implementation package to an application deployment system to integrate the at least one mapped architecture component of the architecture implementation package into the architecture of the application;

executing, by the one or more processing circuits, the at least one mapped architecture component of the architecture implementation package to generate an updated architecture of the application;

in response to executing the at least one mapped architecture component of the architecture implementation package, monitoring, by the one or more processing circuits, the updated architecture of the application to detect architecture deviations from the architecture of the application, wherein the monitoring comprises comparing the updated architecture of the application to the at least one architecture parameter of the application; and providing, by the one or more processing circuits, an indication of compliance or non-compliance with the at least one architecture parameter of the application to the GUI based on the monitoring.

2. The method of claim 1, wherein the outputting further comprises:

determining, by the one or more processing circuits, the integration of the at least one architecture component in the application satisfies the at least one architecture parameter of the application; and identifying, by the one or more processing circuits, the at least one architecture component based on comparing the at least one architecture component to the plurality of mapped architecture components, wherein the at least one architecture component comprises an execution of the at least one architecture parameter of the application.

3. The method of claim 2, wherein the determining further comprises:

determining, by the one or more processing circuits, that incorporating or embedding the at least one architecture component in the application causes the application to meet or exceed at least one predefined benchmark for functionality, performance, or compatibility, wherein the at least one predefined benchmark corresponds to the at least one architecture parameter of the application.

4. The method of claim 3, wherein the determining further comprises:

modeling, by the one or more processing circuits using an integration model, an integration efficiency or performance alignment of the application integrating the at least one architecture component in the application using the at least one predefined benchmark; and outputting, by the one or more processing circuits using the integration model, output data corresponding with the integration efficiency or performance alignment of the application.

5. The method of claim 1, wherein the at least one architecture parameter of the application is at least one of an entity requirement, a security requirement, or a security tolerance requirement, and wherein the at least one architecture framework of the application satisfies a plurality of architecture parameters of the application based on executing the at least one architecture component in the application.

6. The method of claim 1, wherein the at least one mapped architecture component of the architecture implementation package comprises the at least one architecture component, and wherein the at least one architecture framework of the application comprises the plurality of mapped architecture components.

7. The method of claim 6, wherein the mapping further comprises:

extracting, by the one or more processing circuits, a first data package from the at least one architecture component, wherein the first data package comprises integration data corresponding with integrating the at least one architecture component in the application, and wherein the integration of the at least one architecture component in the application comprises updating an application deployment package of the application to comprise the at least one architecture component;

extracting, by the one or more processing circuits, a second data package from the at least one architecture parameter of the application, wherein the second data package comprises one or more criteria for verifying the integration of the at least one architecture component in the application satisfies the at least one architecture parameter of the application;

generating, by the one or more processing circuits, a plurality of application states, wherein a first application state of the plurality of application states is based on the application, wherein a second application state of the plurality of application states is based on integrating the at least one architecture component in the application, and wherein the integration of the at least one architecture component in the application comprises applying the integration data simulating the integration of the at least one architecture component in the application by executing the updated application deployment package of the application;

comparing, by the one or more processing circuits, at least one of the first application state or the second application state of the plurality of application states to the one or more criteria to generate an architecture compliance index; and in response to the integration of the at least one architecture component in the application satisfying the at least one architecture parameter of the application, linking, by the one or more processing circuits, component data comprising the at least one architecture component with parameter data comprising the at least one architecture parameter of the application.

8. The method of claim 7, wherein the simulating comprises:

executing, by the one or more processing circuits, the updated application deployment package of the application in a controlled virtual environment, wherein the controlled virtual environment is configured to emulate or simulate hardware configurations, network conditions, and system interactions of the application.

9. The method of claim 1, further comprising:

monitoring, by the one or more processing circuits, the application for an update to the at least one architecture framework of the application, wherein the update comprises a modification to the at least one architecture parameter of the application, to at least one of the plurality of mapped architecture components, or the at least one architecture framework of the application;

in response to identifying the update to the at least one architecture framework of the application, determining, by the one or more processing circuits, the modification to the at least one architecture parameter of the application, to the at least one of the plurality of mapped architecture components, or the at least one architecture framework of the application causes the application to fail to satisfy the at least one architecture parameter of the application; and wherein the mapping and the outputting is executed by the one or more processing circuits in response to the integration of the at least one architecture component in the application satisfying the at least one architecture parameter of the application.

10. The method of claim 1, further comprising:

identifying, by the one or more processing circuits, the at least one architecture component based on the application profile of the application, wherein the identification of the at least one architecture component based on the application profile of the application comprises:

determining, by the one or more processing circuits, the application profile of the application failing to satisfy the at least one architecture parameter of the application;

identifying, by the one or more processing circuits, a plurality of candidate architecture components including the at least one architecture component; and outputting, by the one or more processing circuits, the at least one architecture component based on comparing the plurality of candidate architecture components to the at least one architecture framework of the application and determining a compatibility between the at least one architecture component and the at least one architecture framework of the application.

11. A system for dynamic architecture mapping using at least one architecture framework of an application, the system comprising:

a data processing system comprising a memory and one or more processing circuits configured to:

identify at least one architecture parameter of the application based on the at least one architecture framework of the application;

generate an application profile of the application based on the at least one architecture parameter of the application;

map, based on the application profile of the application, the at least one architecture parameter of the application to at least one architecture component, wherein mapping the at least one architecture parameter of the application to at least one architecture component comprises verifying an integration of the at least one architecture component in the application satisfies the at least one architecture parameter of the application;

output at least one mapped architecture component corresponding to one or more selectable actions provided to a graphical user interface (GUI) for configuring an architecture of the application;

generate an architecture index of the application corresponding to a plurality of mapped architecture components provided to the GUI for evaluating the architecture of the application;

in response to receiving a selection of the one or more selectable actions provided to the GUI, generate an architecture implementation package, wherein the architecture implementation package comprises the at least one mapped architecture component configured to deploy within the application and integrate with the architecture of the application;

deploy the architecture implementation package to an application deployment system to integrate the at least one mapped architecture component of the architecture implementation package into the architecture of the application;

execute the at least one mapped architecture component of the architecture implementation package to generate an updated architecture of the application;

in response to executing the at least one mapped architecture component of the architecture implementation package, monitor the updated architecture of the application to detect architecture deviations from the architecture of the application, wherein the monitoring comprises comparing the updated architecture of the application to the at least one architecture parameter of the application; and provide an indication of compliance or non-compliance with the at least one architecture parameter of the application to the GUI based on the monitoring.

12. The system of claim 11, wherein the outputting further comprises:

determining the integration of the at least one architecture component in the application satisfies the at least one architecture parameter of the application; and identifying the at least one architecture component based on comparing the at least one architecture component to the plurality of mapped architecture components, wherein the at least one architecture component comprises an execution of the at least one architecture parameter of the application.

13. The system of claim 12, wherein the determining further comprises:

determining that incorporating or embedding the at least one architecture component in the application causes the application to meet or exceed at least one predefined benchmark for functionality, performance, or compatibility, wherein the at least one predefined benchmark corresponds to the at least one architecture parameter of the application.

14. The system of claim 13, wherein the determining further comprises:

modeling, using an integration model, an integration efficiency or performance alignment of the application integrating the at least one architecture component in the application using the at least one predefined benchmark; and outputting, using the integration model, output data corresponding with the integration efficiency or performance alignment of the application.

15. The system of claim 11, wherein the at least one architecture parameter of the application is at least one of an entity requirement, a security requirement, or a security tolerance requirement, and wherein the at least one architecture framework of the application satisfies a plurality of architecture parameters of the application based on executing the at least one architecture component in the application.

16. The system of claim 11, wherein the at least one mapped architecture component of the architecture implementation package comprises the at least one architecture component, and wherein the at least one architecture framework of the application comprises the plurality of mapped architecture components.

17. The system of claim 16, wherein the mapping further comprises:

extracting a first data package from the at least one architecture component, wherein the first data package comprises integration data corresponding with integrating the at least one architecture component in the application, and wherein the integration of the at least one architecture component in the application comprises updating an application deployment package of the application to comprise the at least one architecture component;

extracting a second data package from the at least one architecture parameter of the application, wherein the second data package comprises one or more criteria for verifying the integration of the at least one architecture component in the application satisfies the at least one architecture parameter of the application;

generating a plurality of application states, wherein a first application state of the plurality of application states is based on the application, wherein a second application state of the plurality of application states is based on integrating the at least one architecture component in the application, and wherein the integration of the at least one architecture component in the application comprises applying the integration data simulating the integration of the at least one architecture component in the application by executing the updated application deployment package of the application;

comparing at least one of the first application state or the second application state of the plurality of application states to the one or more criteria to generate an architecture compliance index; and in response to the integration of the at least one architecture component in the application satisfying the at least one architecture parameter of the application, linking component data comprising the at least one architecture component with parameter data comprising the at least one architecture parameter of the application.

18. The system of claim 17, wherein the simulating comprises:

executing the updated application deployment package of the application in a controlled virtual environment, wherein the controlled virtual environment is configured to emulate or simulate hardware configurations, network conditions, and system interactions of the application.

19. The system of claim 11, the one or more processing circuits further configured to:

monitor the application for an update to the at least one architecture framework of the application, wherein the update comprises a modification to the at least one architecture parameter of the application, to at least one of the plurality of mapped architecture components, or the at least one architecture framework of the application;

in response to identifying the update to the at least one architecture framework of the application, determine the modification to the at least one architecture parameter of the application, to the at least one of the plurality of mapped architecture components, or the at least one architecture framework of the application causes the application to fail to satisfy the at least one architecture parameter of the application; and wherein the mapping and the outputting is executed by the one or more processing circuits in response to the integration of the at least one architecture component in the application satisfying the at least one architecture parameter of the application.

20. One or more non-transitory computer-readable media (CRM) having instructions stored thereon that, when executed by one or more processing circuits, cause the one or more processing circuits to:

identify at least one architecture parameter of an application based on at least one architecture framework of the application;

generate an application profile of the application based on the at least one architecture parameter of the application;

map, based on the application profile of the application, the at least one architecture parameter of the application to at least one architecture component, wherein mapping the at least one architecture parameter of the application to at least one architecture component comprises verifying an integration of the at least one architecture component in the application satisfies the at least one architecture parameter of the application;

output at least one mapped architecture component corresponding to one or more selectable actions provided to a graphical user interface (GUI) for configuring an architecture of the application;

generate an architecture index of the application corresponding to a plurality of mapped architecture components provided to the GUI for evaluating the architecture of the application;

in response to receiving a selection of the one or more selectable actions provided to the GUI, generate an architecture implementation package, wherein the architecture implementation package comprises the at least one mapped architecture component configured to deploy within the application and integrate with the architecture of the application;

deploy the architecture implementation package to an application deployment system to integrate the at least one mapped architecture component of the architecture implementation package into the architecture of the application;

execute the at least one mapped architecture component of the architecture implementation package to generate an updated architecture of the application;

in response to executing the at least one mapped architecture component of the architecture implementation package, monitor the updated architecture of the application to detect architecture deviations from the architecture of the application, wherein the monitoring comprises comparing the updated architecture of the application to the at least one architecture parameter of the application; and provide an indication of compliance or non-compliance with the at least one architecture parameter of the application to the GUI based on the monitoring.

* * * * *